United States Patent [19]
Buford et al.

[11] Patent Number: 5,945,948
[45] Date of Patent: Aug. 31, 1999

[54] METHOD AND APPARATUS FOR LOCATION FINDING IN A COMMUNICATION SYSTEM

[75] Inventors: Kevin A. Buford, Franklin, Mass.; John D. Reed, Arlington; Walter J. Rozanski, Jr., Hurst, both of Tex.; Amitava Ghosh, Vernon Hills, Ill.

[73] Assignee: Motorola, inc., Schaumburg, Ill.

[21] Appl. No.: 08/706,751

[22] Filed: Sep. 3, 1996

[51] Int. Cl.⁶ .................................................. G01S 3/02
[52] U.S. Cl. ................................................... 342/457
[58] Field of Search ................................. 342/457, 357; 375/200; 455/422

[56] References Cited

U.S. PATENT DOCUMENTS

| | | | |
|---|---|---|---|
| 5,175,558 | 12/1992 | Dupree | 342/378 |
| 5,265,121 | 11/1993 | Stewart. | |
| 5,317,323 | 5/1994 | Kennedy et al. | 342/457 |
| 5,506,864 | 4/1996 | Schilling | 375/205 |
| 5,508,708 | 4/1996 | Ghosh et al. | 342/457 |
| 5,515,378 | 5/1996 | Roy, III et al. | |
| 5,583,517 | 12/1996 | Yokev et al. | 342/457 |

OTHER PUBLICATIONS

Joseph Kennedy and Mark C. Sullivan, "Direction Finding and 'Smart Antennas' Using Software Radio Architectures", May 1995, pp. 62–68.

*Primary Examiner*—Theodore M. Blum
*Attorney, Agent, or Firm*—Jeffrey G. Toler; Bruce Terry; Mario J. Donato, Jr.

[57] ABSTRACT

A method for determining a subscriber unit location in a communication system is provided. The method includes the steps of receiving a signal from the subscriber unit at a first base station, determining a first receive time of the signal based on a sequence of spreading symbols at the first base station, determining a first angle of arrival of the signal at the first base station, and determining the location of the subscriber unit from the first receive time, the first angle of arrival, and further predetermined information about the first base station. The signal is formed via modulation by the sequence of spreading symbols.

51 Claims, 14 Drawing Sheets

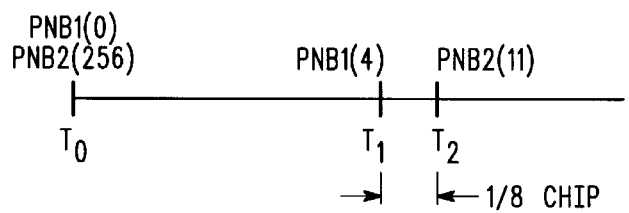
FIG.3
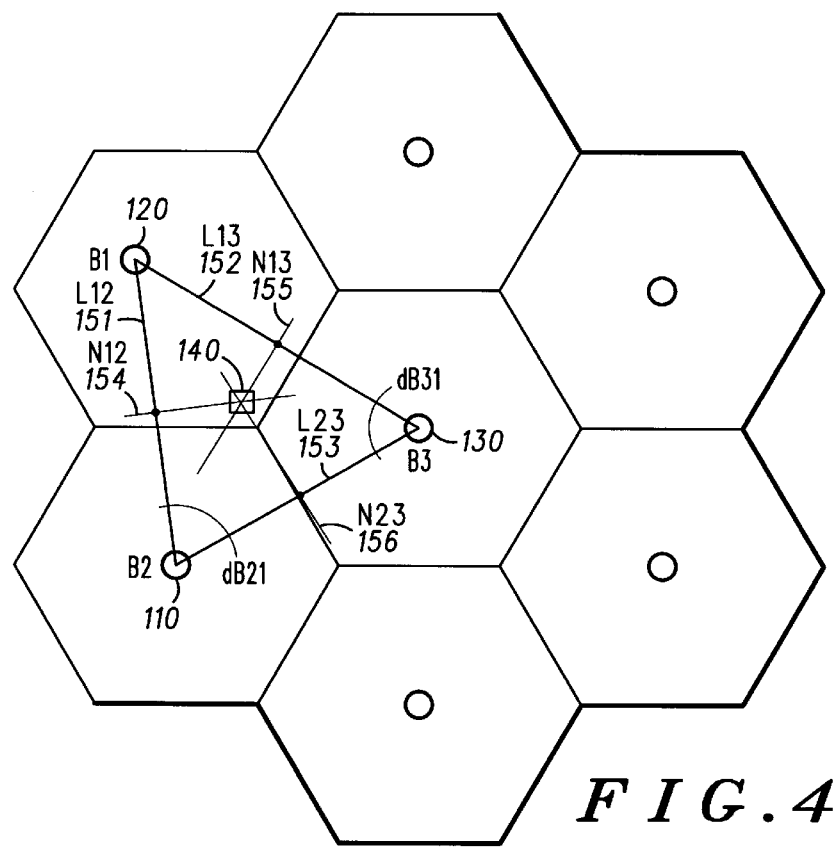
FIG.4
FIG.6
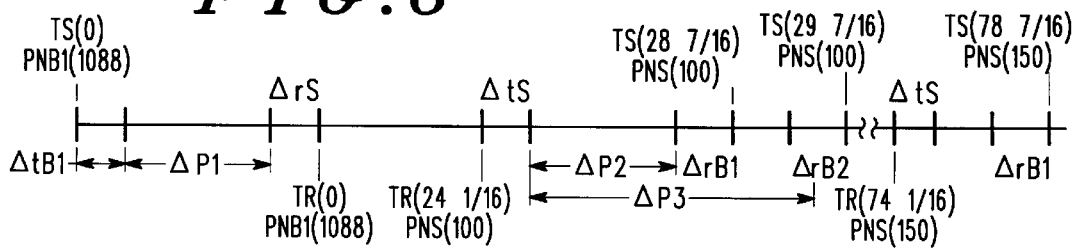

400

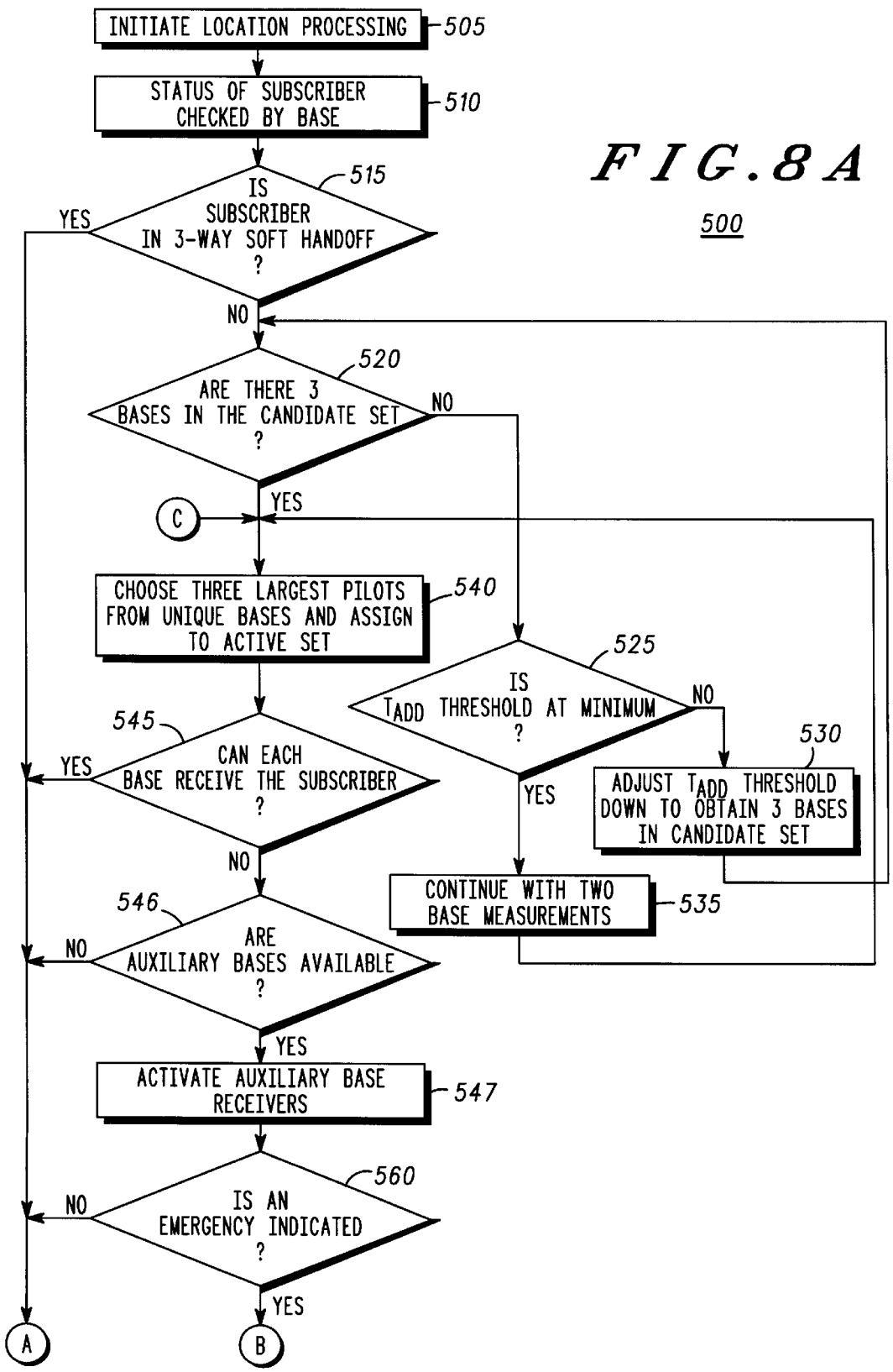

METHOD AND APPARATUS FOR LOCATION FINDING IN A COMMUNICATION SYSTEM

FIELD OF THE INVENTION

The present invention relates, in general, to wireless communication systems and, more particularly, to a method and apparatus for locating a subscriber unit in a Code Division Multiple Access (CDMA) wireless communication system.

Background of the Invention

In a wireless communication system it is often desirable to locate users who are making calls. Applications for such a technology would include 911-emergency services, so that police/fire/ambulance services could be dispatched to a user making a call. Other applications would include fraud detection, police investigations, and the like.

Previously installed cellular systems had little capability in this regard. For example, in AMPS (Advanced Mobile Phone System) Cellular Radio, a user could be located within a cell by determining which base station antenna was used to serve the user. However a cell could be as large as 3–5 miles in radius, making this information practically useless. Since many of the dense urban cell sites are now much smaller, and many of the urban/suburban cell sites are now sectored, using sectored antennas to limit a channel's service area to just one sector of a cell, the coverage areas of a cell are now smaller. However, the area even in these smaller cells can still be more than one square mile. This still makes locating a user impractical for most purposes. Other radio systems, like US Digital Cellular (USDC) and Group Speciale Mobile (GSM) use the same method of identifying the cell or sector, and thus could do no better than the AMPS system.

While there are other location alternatives, such as the use of Global Positioning System (GPS) units at the subscriber unit, or triangulation onto a transmitting subscriber unit, these and similar approaches are too costly to be used by most subscribers, or in the case of triangulation, require other costly and time-consuming resources to be dedicated.

There remains therefore a need for an improved, cost-efficient approach for locating subscribers in a wireless communication system.

SUMMARY OF THE INVENTION

These problems and others are solved by an improved method and apparatus according to the invention. In accordance with a first aspect, a method for determining a subscriber unit location in a communication system includes the steps of receiving a signal from the subscriber unit at a first base station, determining a first receive time of the signal based on a sequence of spreading symbols at the first base station, determining a first angle of arrival of the signal at the first base station, and determining the location of the subscriber unit from the first receive time, the first angle of arrival, and further predetermined information about the first and second base stations. The signal is formed via modulation by the sequence of spreading symbols.

In accordance with a further aspect, a method for estimating a subscriber unit location includes the steps of performing a first location measurement having a first confidence level, performing a second location measurement having a second confidence level, and determining an estimated location of the subscriber unit based on the first and second location measurements. The first location measurement is determined by receiving a signal from the subscriber unit at a first base station, determining a first receive time of the signal based on the sequence of spreading symbols at the first base station, and determining a first angle of arrival of the signal at the first base station. The signal is formed via modulation by the sequence of spreading symbols.

In accordance with another aspect, a communication system includes a controller and a location processor that is responsive to the controller. The controller is responsive to a first and a second base station, each of the first and second base stations comprising a receiver operable for receiving a signal from the communication unit, the signal being formed via modulation by a sequence of spreading symbols, and a detector operable for determining a receive time of the signal based on the sequence. The location processor is responsive to the controller and is operable for requesting the first and second base stations to determine first and second receive times of the signal based on the sequence, and for determining a location of the communication unit from the first and second receive times and further information about the first and second base stations.

In accordance with yet another aspect, a method for determining location of a subscriber unit includes receiving a first signal from a first base station of the plural base stations and a second signal from a second base station of the plural base stations, determining a first receive time based on a first sequence and a second receive time based on a second sequence, and determining the location of the subscriber unit from the first and second receive times and further information about the first and second base stations. The first and second signals are formed based on the first sequence of symbols and the second sequence of symbols, respectively.

BRIEF DESCRIPTION OF THE DRAWINGS

The invention itself, together with its intended advantages may best be understood by reference to the following detailed description, taken in conjunction with the accompanying drawings, of which:

FIG. 3 is a diagram illustrating location finding of a CDMA subscriber unit according to an embodiment of the invention;

FIG. 4 is a diagram illustrating a timing sequence used in determining propagation delay for location of a CDMA subscriber unit according to an embodiment of the invention;

FIG. 6 is a timeline diagram illustrating propagation and delay times used in calculating a subscriber according to an embodiment of the invention;

DETAILED DESCRIPTION OF THE DRAWINGS

Figure 1:
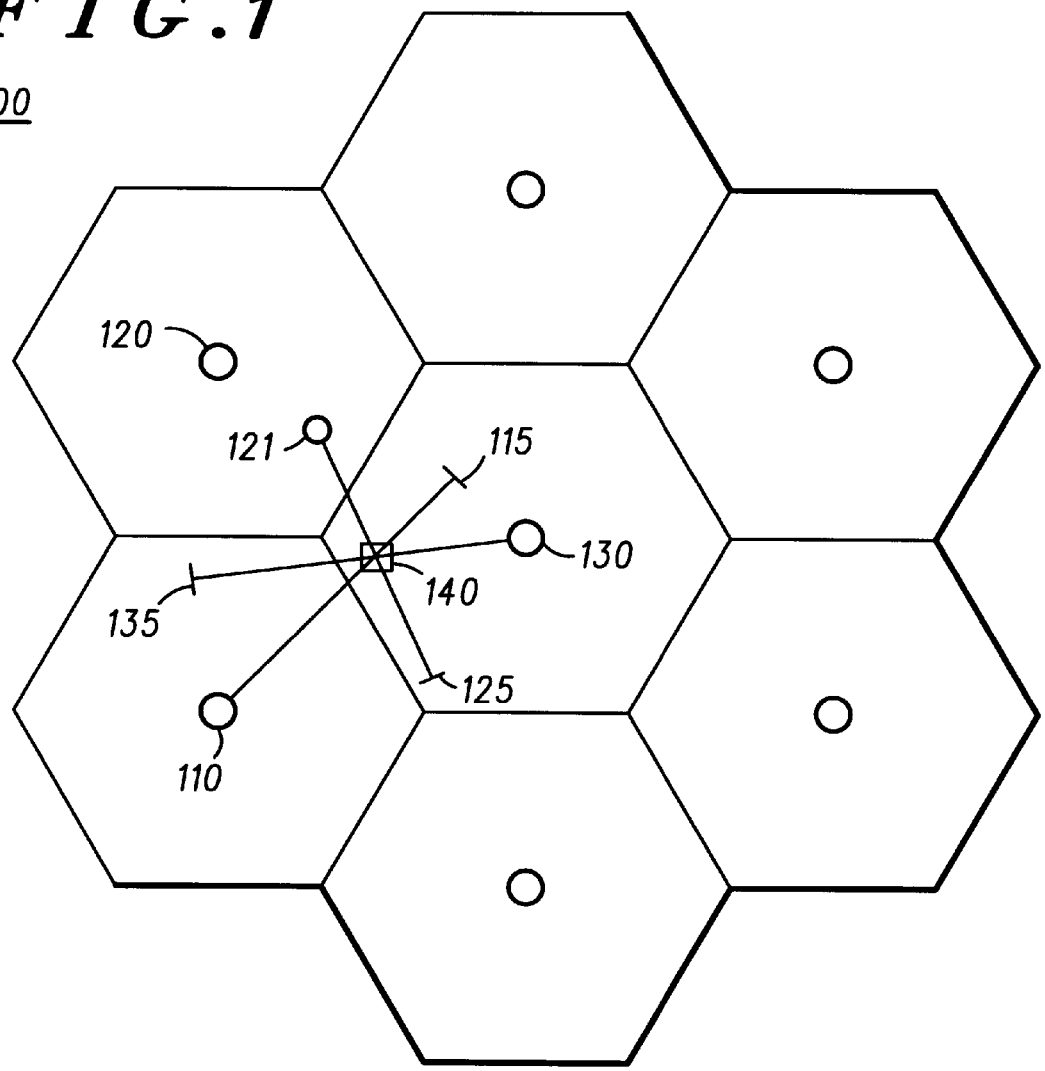
FIG. 1 is a simplified diagram illustrating a cellular system which may employ the present invention.

A first embodiment of the invention is a system for determining the location of a user in a Code Division Multiple Access (CDMA) cellular system. Using the CDMA modulation information, an estimate of the time of flight or propagation is made of the first arriving ray at a subscriber unit. The first ray received typically represents the shortest path between the base and subscriber, and the time of flight estimate allows the calculation of the distance between the subscriber and the base station. By calculating the distance to multiple, e.g., three, sites, a specific subscriber location can be calculated limited by the accuracy's of the measurement timing and other processing delays.

In the first embodiment the time of flight of the signal between each base and subscriber is calculated automatically within a correlation receiver. The processing steps involve the transmission of a Pseudo Noise (PN) sequence coded signal time-aligned to under a chip accuracy (e.g., 1/16th of a chip), and correlating on this signal at the receiver using a correlation algorithm. Because the modulation sequence (e.g., a PN sequence) is known and used in synchronization/despreading, a precise time of reception of a given chip can be determined. By determining reception time for multiple related signals, a time delay can be calculated and used to determine a position estimate.

In one implementation, the subscriber uses known PN sequence and offset information to determine which related PN chips from different bases (standard and/or auxiliary bases) that were transmitted at the same time, and also determines the time of reception of these related chips. From the difference between the reception times, a time differential and thus distance differential is determined. Using the distance differentials and known positions of the bases, a position estimate is determined. Where a subscriber is only in communication with one or two bases, additional bases may be forced into an active set (including auxiliary sites, if needed) so that time measurements can be made by the subscriber.

In another implementation, receiving base sites are controlled to make time measurements of selected chips, and the difference in receive time is used to similarly calculate the subscriber position. Where additional receive sites are needed because of interference and the like, auxiliary sites are controlled so as to receive the signals transmitted from the subscriber unit. If necessary, in case of an emergency, the subscriber unit is powered up to a maximum power level such that at least three base stations can receive and make a time estimate of the signal. Further, where more precise measurements are needed, a special location message can be transmitted to the subscriber. Upon receipt, the subscriber determines a chip/time offset for a response signal, encodes the offset and transmits the response signal. Upon decoding the offset and comparing the receive times of a same chip (e.g., the first chip of a frame) used in determining the offset, a delay compensated time value is determined for the various propagation paths, and the position determined therefrom. Finally, since it might be difficult to get a received signal at bases further away, an emergency load shedding can be performed at the nearby bases to provide extra range, since capacity can be traded off for range in a CDMA radio system. Thus coverage is improved, and location finding is made more reliable.

Turning now to FIG. 1, a cellular system is generally depicted as 100 having a hexagonal cell pattern with base stations 110, 120, 130, and a subscriber 140. Auxiliary base units 121 are also located between bases 110, 120 and 130. The distance between bases 110, 121 and 130 and the subscriber unit 140 is estimated by determining the time of flight or propagation of the first arriving ray which is measured from a predefined reference time to the point in time that the receiver performs a correlation on the transmitted signal. This is made more difficult, in that the distance estimate may be overestimated, or underestimated since the measurement is made to an arbitrary time reference point in the receiver (a precise measurement would only be available if a more accurate (and costly) timing system such as one derived from a GPS signal or atomic clock is used in the subscriber 140). Thus, the distances 150, 160 and 170, respectively, may be longer or shorter than the actual distance between each base 110, 121, 130 and the subscriber 140 based on correlation to a chip rate (at an approximately 814 nanosecond (ns) chip rate (i.e., the rate of the fully spread signal, which is determined in TIA (Telecommunications Industry Association) Interim Standard IS-95A by the PN sequence rate), or approximately 250 meters (m) per chip; so it is desirable to achieve time measurements at faster than the chip rate). In FIG. 1, the distance 150 is shown to be overestimated indicating a point 125 beyond the subscriber unit's actual location. Likewise points 115 and 135 are also overestimated. These points will be corrected by the distance processing described below, yielding an estimate much closer to the subscriber's true location.

Figure 2:
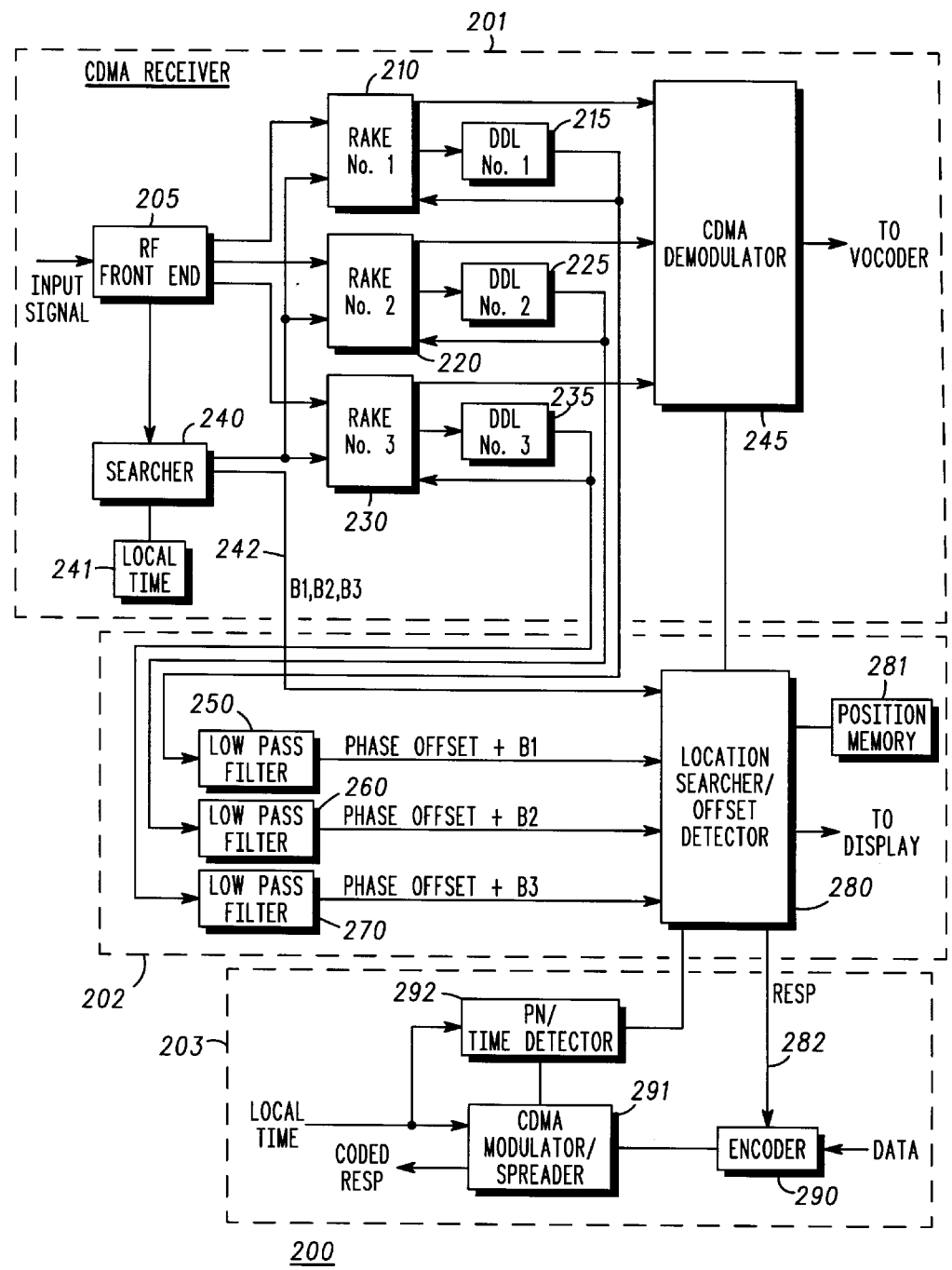
FIG. 2 is a block diagram of a CDMA receiver at a subscriber unit according to a first embodiment of the invention.

FIG. 2 is a block diagram illustrating a CDMA subscriber unit 200 having a CDMA receiver 201, locator unit 202, and transmitter 203. The receiver 201 has a common RF (radio frequency) front end 205 which feeds three independent rake inputs, 210, 220, 230. These rake units 210, 220 and 230 can lock onto three different received rays that are approximately one PN chip time or more apart, which is typical of a direct sequence spread spectrum (DSSS) receiver. The searcher 240 scans for new correlation peaks at faster than the chip rate (in the preferred case allowing for resolutions as fast as the 50 ns clock rate), and can reassign the rake inputs based on its best estimate of current channel conditions. Normally, the correlators for rakes 210, 220 and 230 lock onto the three strongest rays that are available, and when a second or third base station can supply a signal sufficiently strong, they are reserved for locking onto these other base stations signals which are also delayed in time more than one PN chip time respectively, as described by the IS-95A Standard. If only two base stations are sufficiently strong, then two rays are dedicated, one for each base station, and the third ray to the strongest remaining ray for either base station.

When a location finding function is desired by the subscriber 200, it is preferable to attempt to find three different base stations, one for each ray so that sufficient information is available to accurately estimate the location. Thus, to connect to three base sites the rakes 210, 220 and 230 are adjusted so that at least three base unit signals are decoded. If available, emergency pilot generators (such as auxiliary base unit 121 of FIG. 1) physically located between the base sites could be activated in response to a beacon request in order to blanket the area with additional reference signals, allowing the subscriber to make location estimates based on these pilot generators as well as the standard base sites. These auxiliary units would have a different PN offset than the surrounding base stations, and would typically be equipped with a GPS receiver for proper synchronization/timing. They would be coupled to the base stations or other controller in the infrastructure by any convenient means, e.g. wireless or twisted pair cable. Their activation is preferably accomplished by a request to the controller, or command from the serving base station to a local auxiliary unit under its control, upon indication by the subscriber that less than three bases are available. Alternatively, the auxiliary units could be equipped with scanning receivers that, in response to a request signal by a subscriber, would begin transmitting for a limited period (e.g., 5 seconds, in order to minimize system interference). By appropriate placement, such auxiliary units can be used to reduce uncertainties at certain locations or generally increase the accuracy of position finding in strategic areas, such as major highways, malls, or central business districts. Because of the interference-limiting nature of a CDMA system, in some cases only one base station will be able to receive the subscriber's signal, and vice-versa, so the auxiliary units are needed to obtain the necessary multiple readings.

The relative time of reception of each signal is determined by using information about the leading edge (or alternately, the peaks) of related correlation peaks in the searcher, and adjusting this by an offset determined in a fine time alignment circuit (e.g., delay lock loops (DLLs) 215, 225 or 235 for each branch, coupled with filters 250–270). Preferably related correlation peaks are those received on different branches but within one chip of each other. In this approach, the precise time of the leading edge is determined, along with the PN sequence number (i.e., the chip position (e.g., number 245) of the repeating PN sequence (e.g., approximately 16,000 chips in length)). Using the already determined PN sequence offset, and the system design where the base PN sequence is the same for each base station, and transmitted at the same system time plus or minus a unique PN sequence offset, the difference in relative times yields a difference in propagation path delay. This is illustrated in FIG. 3. At time T0 two bases B1 and B2 are transmitting, but base B1 transmits PN chip 0, while base B2 transmits PN chip 256 since it has a PN sequence offset of 256 chips. At some time T1, after location finding is activated, the subscriber determines that the leading edge of PN chip 4 from B1 has been received. The next leading edge of a PN chip from base B2 is received ⅛th of a chip later at time T2, and the chip is determined to be the 280th in the PN sequence. From these receive times and PN numbers, the propagation delay difference is calculated to be ((PNB2−offset) +(receive difference, T2−T1))−(PNB1−offset)=((261−256)+(⅛))−(4−0)=1⅛ chips*814 ns/chip=916 ns. At approximately ⅓ meter (m) per ns propagation speed for a radio signal, this translates into about 300 m difference in propagation path distances. The precision in location is only limited by the system clock rate being used and degree of synchronization. Where all base stations are using GPS timing information, synchronized transmissions (i.e., of the leading edges of chips) to within 50 ns (or approximately ¹⁄₁₆th of the chip rate) are currently possible. With a local clock generating at least the same 20 MHz clock rate, location to within 100 ns or 30 m is possible.

Returning to FIG. 2, DLLs 215, 225, and 235 are fed back to each rake 210, 220 and 230, respectively, for adjusting the signals to output fine time aligned signals. As noted above, the DLL outputs can also serve as fine phase offset information for adjusting the receive times of the PN chips, preferably after filtering in Low Pass Filters (LPFs) 250, 260, 270 for each channel, respectively, which effectively averages the outputs of each DLL 215, 225, 235. This averaged fine phase offset information, together with the chip number/times/base identification or offset (i.e. B1–B3 information) from searcher 240 (which is also adapted for PN chip/time detection), are fed to location searcher 280. Location searcher 280 takes the fine phase offset information from each branch and corrects the time of reception from searcher 240 for each chip, to give a corrected relative time of reception for each branch. From the earliest time, say B1 (i.e., the time the signal from base 1 is received), the difference tB21 and tB31 in reception time for the other signals B2 and B3 is determined, and the corresponding distances dB21 and dB31 determined. One thus knows that the distance from bases 1 (110), 2 (120) and 3 (130) are dB1, (dB1+dB21) and (dB1+dB31), respectively. Further, from the PN offsets, the identity of the bases are known and their geographic position can be retrieved from memory 281. It is then a simple matter of performing a search routine to determine, one such as illustrated in FIG. 4, to determine the geographic coordinates of the mobile. In the example of FIG. 4, the known base locations are used to define three lines L12 (151), L23 (152) and L13 (153). The distances dB21 and dB31 are subtracted from lines L12 (151), L23 (152) and L23 (152), L13 (153) respectively, and the remaining segments bisected by normal lines N12 (154), N23 (156) and N13 (155). The intersection of these lines N12 (154), N23 (156) and N13 (155) is the position of the subscriber 140. This information could then be sent to the serving base station for forwarding to a requesting party of serving location register, or could be forwarded for use by the subscriber (e.g., on a map grid or other location device, not shown).

Alternatively, if base site location information is not available to the subscriber, the phase offset, chip, timing and base offset information can be sent in a location request signal to a serving base station. There, a location searcher can access its own database and determine the subscriber location. This location information is then transmitted back in a location response message to the subscriber or other requesting entity.

Figure 5:
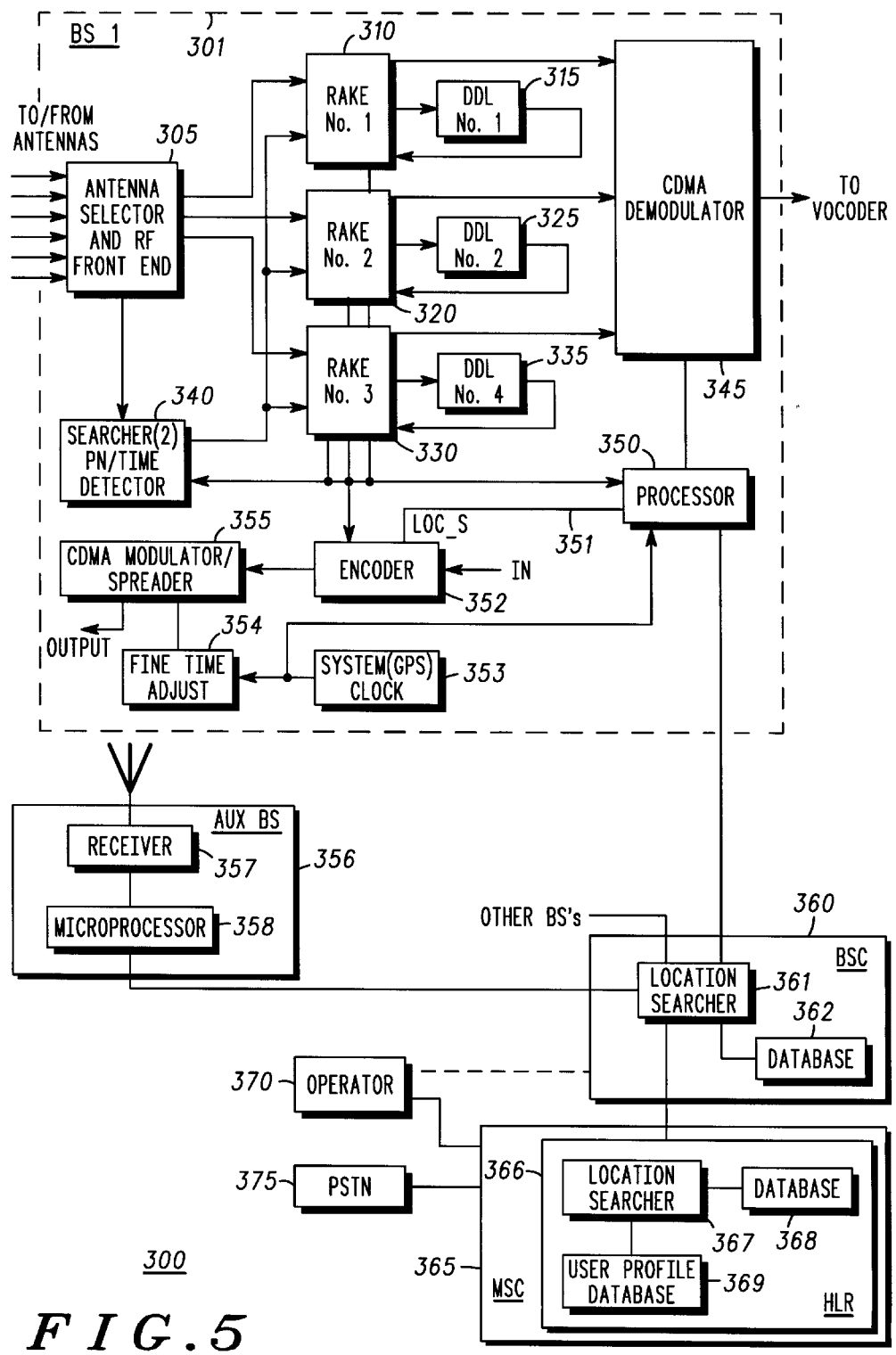
FIG. 5 is a block diagram of a CDMA receiver at a base station according to an embodiment of the invention.

A preferred approach, however, for location using infrastructure equipment can be seen with reference now to FIG. 5, which generally depicts a block diagram of a CDMA infrastructure system 300 having a first CDMA base station 301. Base 301 has a common RF front end 305 which feeds four independent rake inputs, shown as 310, 320, . . . 330. These rakes can lock onto four different received rays that are at least one PN chip time apart, which is typical of a DSSS receiver. The two searchers 340 scan for new correlation peaks, and can reassign the rakes based on its best estimate of current channel conditions. Normally, the four correlators of rakes 310, 320, 330 lock onto the four strongest rays that are available.

When a location finding function is desired, two general approaches are available—either passive (i.e., no subscriber unit response) or active. In either case it is preferable to find at least three different base stations capable of receiving a subscriber signal, so that sufficient information is available to estimate the location. In a first embodiment passive mode, four rake branches 310, 320 . . . 330 of base 301 are used to detect an uplink signal. From each rake, a Delay Lock Loop (DLL) is used to generate an estimate of the timing (i.e., adjustment) of the correlated ray. This more accurately estimates the time of the correlation, similar to the process used by the subscriber unit above. Searcher and Chip/Time Detector 340 peak correlates the signal on each branch, and also determines the best branch to use (preferably based on the earliest received peak for the same chip, but other selection techniques may be used to determine a current best branch); this best branch signal is used in determining PN chip and receive time information, similar to that in subscriber searcher 240.

To initiate a location process, in a preferred embodiment a command is initiated within the system 300, most likely at a regional entity such as a mobile switching center (MSC) 365, operations center, or perhaps within a connected network such as PSTN (public switched telephone network) 375. A location request is then processed via home location register (HLR) 366 to determine the currently serving base station(s). Upon receipt of a location command, processor 350 of base 301 (and similar processors of other serving bases) uses detector 340 to determine a chip receive time. Preferably this is accomplished by all bases determining the leading edge rise time of a specified group of PN chips, for example by determining the rise time for each 64th chip (i.e., PN sequence number 0, 64, 128, etc.) for a predetermined number of chips, e.g., 10. This information is then forwarded by each base receiver, along with its ID (identification), to a designated entity, e.g. location searcher 361 of BSC (base site controller) 360, or location searcher 367 of HLR 366, etc.. Thus, the difference in receive time for the same chips, each chip being derived from the same single chip transmission, may be used to determine propagation delay differences. In other words, for each chip number the differential between receive times at the different bases yields a propagation difference, and location may be determined from this information in conjunction with the known location of the receiving bases, in a similar manner as described above with FIG. 4. By taking plural sets of information in a relatively short time frame (e.g., 10 times, every 64 chips, across about 500 microseconds), and averaging or otherwise best-fit calculating using the determined positions, position errors can be minimized. A skilled artisan will appreciate that other approaches can be used in the actual calculation. For example, a detection at the same system time(s) for leading edges within one chip of the designated time(s), along with time differences from the designated system time and chip number, could be used in determining the propagation delay differences (albeit, an additional error may arise because the transmit time for the different chips is limited by the accuracy of the subscriber's clock rate; even if a 50 ns clock cycle were present, this is still more error than present from a transmission of the same chip (which has no timing error). What is important is that the chip ID (e.g., number/position in the PN sequence) and precise time of reception (e.g., leading edge, or peak, at the oversampled clock rate) at different bases be used in determining the subscriber location.

In a preferred embodiment for active location, a two-way ranging system is implemented using both chip receive time information and certain response information from the subscriber. In this embodiment, the process is again initiated with a location request in the system infrastructure, forwarded to base 301 which is in communication with the subscriber. Processor 350 forwards a location request signal (LOC_S 351) for appropriate encoding by encoder 352 and spreading modulator 355. Using a system clock 353 (preferably GPS derived, but other precise means such as an atomic clock may be used), fine time adjuster 354 (e.g., a strobe generator) controls the modulator 355 to precisely output the leading edge of the output chips, preferably within 50 ns accuracy. Processor 350 also determines via modulator 355 and clock 353 a precise system time for a reference chip (say, chip 1024 of a sequence of 16384 chips, at system time TS(0)), from which other chip transmission times can later be determined. The output chip sequence is then transmitted to the subscriber.

Referring once more to FIG. 2, following demodulation and receipt of the location request signal 351, processor 280 controls searcher 240 to determine ID and timing information for a next PN chip, in a similar manner as described above. For purposes of illustration, let us say the determined chip is 1088 (of the base PN sequence) at subscriber relative time TR(0). In order to provide accurate information for turn around time within the subscriber, processor 280 then determines a local time at which a predetermined chip of the subscriber PN sequence will next be transmitted. For convenience, this predetermined chip is preferably selected as one of a repeating series (say every 50th chip of the subscriber's PN sequence) yet to be transmitted (say, chip 100); almost any other chip could be selected, e.g., the first chip for the next 20 ms frame, but preferably with a view to minimizing subscriber precise-timing output requirements and system location processing. In any event, the selected chip's local time for output from modulator 291 of transmitter circuit 203 is determined, e.g., by determining a current chip's output time (e.g., via PN/Time detector 292) and calculating forward to determine the predetermined chip's output time (say, chip 100 at TR(24 $\frac{1}{16}$), relative time here being measured in chip rate intervals). Of course, if no current transmission is in progress a sufficient delay time would be given (e.g., approximately 2 seconds) for the bases to train to the subscriber's PN sequence before transmission of the predetermined chip. The processor would then forward a location response signal RESP 282 for encoding by encoder 290, and would control modulator 291 to precisely output the predetermined chip at the determined time (i.e., TR(24 $\frac{1}{16}$)), and, if a periodic group of chips is to be monitored, to precisely output any subsequent chips of the periodic group (e.g., chips 150, 200, etc.) for a predetermined period. The RESP 282 would include the base chip information (1088, TR(0)), the predetermined chip information (100, TR(24 $\frac{1}{16}$), and, if not already known by the infrastructure as part of the subscriber unit profile, a predetermined (i.e., calibrated/calculated) subscriber delay factor for pre-acquisition and post-output delays (i.e., the time it takes a signal at the antenna to reach searcher 240, and for an output signal to be radiated at the antenna following the time-precise output from modulator 291).

Returning to FIG. 5, at the same time the system controls base 301 to send the location request signal 351, it also notifies the other communicating bases to begin storing location information. Where there are less than 3 bases in communication (i.e., soft-handoff) or capable of receiving the subscriber signal, the originating entity (e.g., location searchers/processors 361 or 367) will command one or more auxiliary base stations, such as base 356, located in the vicinity of the serving bases to begin receiving at the subscriber's designated frequency. Thus, in the simplest implementation the auxiliary bases could be tunable receivers with a precise system clock (e.g., a GPS-corrected clock); if an auxiliary base was not connected via wireline to a BSC, the auxiliary base could be implemented as fixed subscriber unit (such as a wireless access fixed unit (WAFU)), the only difference from a subscriber being that the WAFU would be operating at system time (e.g., via the GPS clock). In this latter embodiment the WAFU would communicate its location response information via its own serving base station, e.g. base 301.

All receiving bases, e.g., base 301 and auxiliary base 356, begin storing subscriber chip/time information upon initiation of the location request. The stored information could be the time (e.g., leading edge receive time) and chip number for each chip received for a predetermined period. Rather than saving every chip, which in one 20 ms frame would mean close to 25,000 entries, a periodic number of chips (e.g., every 50 th chip in the sequence) is preferably used by all receiving bases; in this latter case the subscriber would be configured as discussed above so as to choose a predetermined chip that is one of these periodic chips (such as chip 100). A skilled artisan will appreciate that any number of periods, or specific chips (e.g., the first chip of a frame) can be used, as long as information is being gathered on the same chip(s) at all bases in order to minimize error. Preferably, for convenience, an appropriately configured subscriber will select the predetermined chip so as to coincide with the chip(s) being monitored for by the bases, thus simplifying later calculations; the selection could be based on preprogramming, or upon data in the location request signal 351 indicating the chip(s)/period to be monitored (in which case only the predetermined chip(s) need be precisely outputted).

Upon receiving the spread RESP signal from the subscriber (preferably sent via in-band signaling with any ongoing voice/data communications), processors 350 and 358 of bases 301 and 356 detect the signal and predetermined chip information, and forward some predetermined number of chip/time pairs to location searcher 361 or 367. For example, to allow for averaging to improve accuracy, each base 301, 356 may forward 8 chip/time pairs, starting with the predetermined chip and its receive time (e.g., pairs {100, TS(28 7/16)}, {150, TS(78 7/16)}, . . . {450, TS(378 8/16)}, along with the RESP signal information (e.g., the base chip/time pair {(base)1088, TR(0)}, the predetermined chip/time pair {(subscriber)100, TR(24 1/16)}, and known delay factor {4/32}). A timeline illustrating this sequence is shown in FIG. 6. TS(0) represents a starting system time, shown here as the 0th bit of the system clock for convenience, while TR(0) represents the subscriber's relative clock time. PNB1 (1088) represents the 1088th chip in the first base station's (301) PN sequence, while PNS(100) represents the 100th chip in the subscriber's PN sequence. Thus, base chip 1088 is outputted at system time 0, and radiated from the base antenna a transmit delay time ΔtB1 later. After a propagation delay ΔP1 and subscriber receive delay time ΔrS (i.e., from the subscriber antenna to detector 240) later, detector 240 determines chip 1088 to be received at TR(O). Processor 280 then determines the next 50th chip of the subscriber sequence to be chip 100, and calculates from a current subscriber chip/time that the output time for chip 100 will be TR(24 1/16). Knowing the calibrated delays ΔrS and ΔtS (the delay from output to antenna radiation), say 2/32 chips each, the subscriber sends the RESP signal 282 including information, e.g., [{1088,TR(0)}, {100,TR(24 1/16), {4/32}].

Base 301 detector 240 receives subscriber chip 100 at system time TS(28 7/16) and base 357 receives it at time TS(29 7/16), with propagation and receive (i.e., antenna to detector) delays of ΔP2, ΔrB1 and ΔP3, ΔrB2, respectively. Similar repeat measurements are also performed, for example base 301 receiving chip 150 at time TS(78 7/16), the subscriber having controlled the output time of chip 150 to TR(74 1/16), i.e., precisely 50 chips (40,700 ns) later.

After a predetermined number of pairs are determined, the chip/time information and response signal information are forwarded to the location searcher 361 or 367. The searcher 361 or 367 then calculates the propagation delays, e.g., ΔP1–ΔP3, using the other known information. In this case, let the calibrated base delays ΔtB1, ΔrB1 and ΔrB2 be 5/32, 3/32 and 3/32 chips. Because ΔP1 is essentially the same as ΔP2, then $$2\Delta P1 = (TS(28\ 7/16) - TS(0)) - (\Delta tB1 + \Delta rB1) - (TR(24\ 1/16) - \quad \text{Eq. 1}$$
$$TR(0)) - (\Delta rS + \Delta tS)$$
$$= (28\ 7/16) - (8/32) - (24\ 1/16) - (4/32)$$
$$= 4\ \text{chips}$$

Thus, ΔP1 is 2 chips, or 1628 ns, and the propagation path length is about 488 m (+/–30 m at 100 ns total uncertainty). Once ΔP1 is known, ΔP3 can similarly be calculated, yielding in the illustrated case a time of 3 chips and distance of 733 m. By calculating the propagation path length for at least three receivers, and retrieving the location information on the receiving bases (e.g., from databases 362 or 368) the position of the subscriber may be determined by calculating the unique point (or small region of highest probability) at which the respective propagation paths can all intersect. The process is repeated for each time/chip set. Each calculated point (or centroid of the probably region) is then used in determining the subscriber location, e.g. most simply by averaging, although any suitable process for fitting determining a most likely point/region from multiple points/regions can be used. The location of the most likely point/region is preferably stored in the user profile database 369 of HLR 366. Additionally, the entire process can be repeated after one or more further periods of time, on the order of seconds or minutes, with the plural most likely regions being used to determine a speed and direction of travel of the subscriber; if an accurate enough subscriber clock is being used so drift is under 50 ns for an extended period of multiple minutes (i.e., the subscriber clock's offset from the system time is known for that period), repeated detections at the bases could be performed without the need to repeat the request signal). Finally, the determined location, and travel speed/direction, are forwarded to the originally requesting entity, e.g. to operator 370 or via PSTN 375.

A particular advantage of using the active location process over the inactive one is that, if desired, three-dimensional information can be more accurately determined. This is particularly useful in urban or hilly areas, where the angle of incline for the propagation paths can be significantly greater than 0 degrees from the horizon. While three dimensional coordinates of the bases, and known topography of a first approximation subscriber location, can be used to increase the accuracy of the passive process, a skilled artisan will appreciate that a better approximation can be derived from the measured propagation time, as opposed to just differences in propagation times. Because the determined propagation paths are as accurate in three dimensions, it is just a matter of additional processing of the z-axis (i.e., third dimension) coordinates of the base site locations, along with their x- and y-axis coordinates, to determine the three-dimensional region of probable location. If this is compared against known building and topographical information, location to within +/– 8 stories (at 100 ns uncertainty) or better in a single building is may be possible. Additional information, such as relative received signal strengths and likely path loss characteristics into a building, could be used to further narrow the region of probable location.

Figure 7:
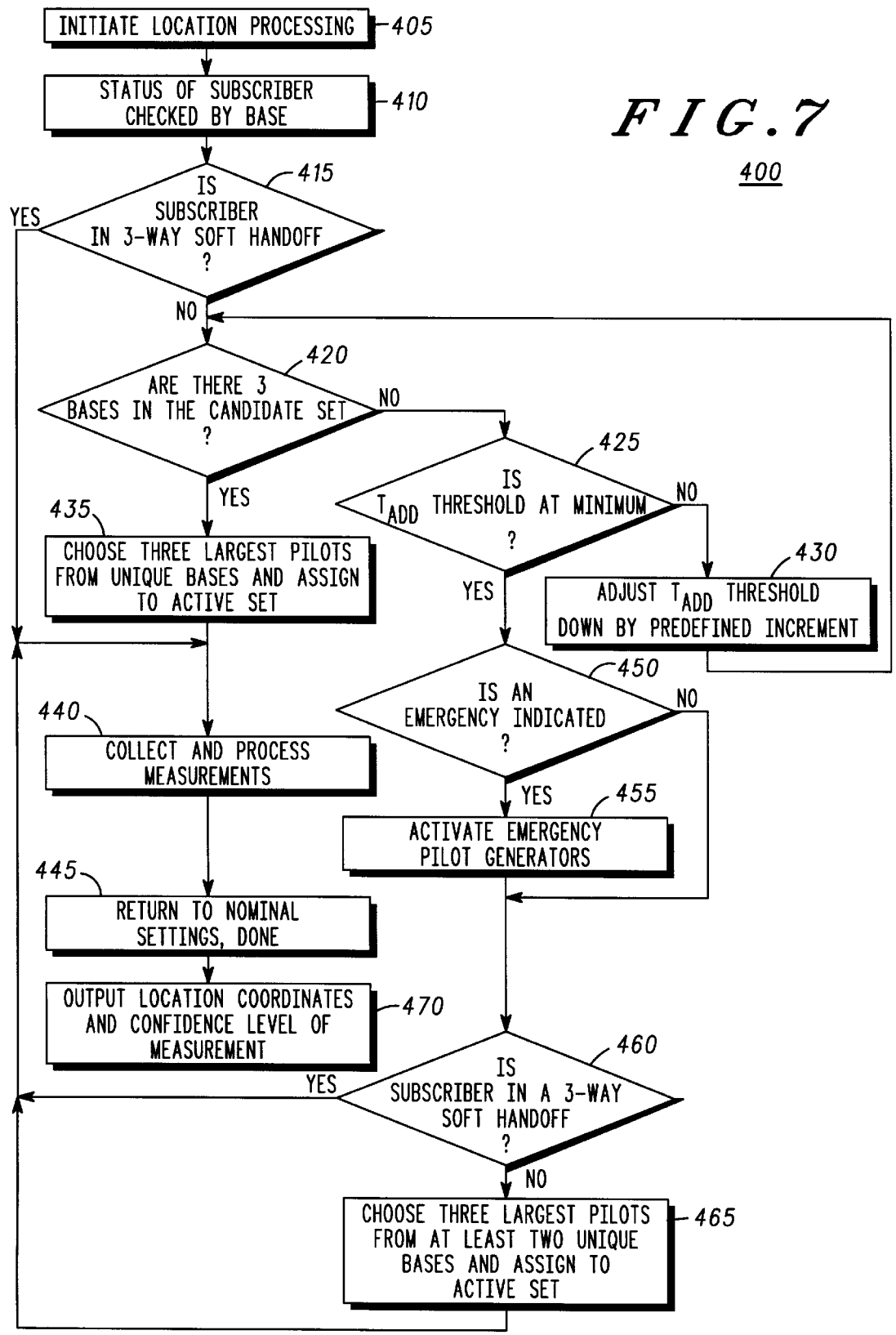
FIG. 7 is a flow chart illustrating the process by which a subscriber measures base station signals according to an embodiment of the invention.

FIG. 7, generally designated as 400, is an illustrative flow chart of the system process for a subscriber measuring base station signals to obtain a location estimate. The process is started in block 405, which represents the occurrence of a location command to be performed by the subscriber (e.g., by subscriber initiation, or automatically based on other indicator such as a motion sensor indicating a vehicle crash). Block 410 checks the status of the subscriber and a decision is made 415 based on whether or not the subscriber is in 3-way soft handoff. If it is not, block 420 is executed which tests to see if there are three bases in the candidate set. If not, decision block 425 is tested to check the threshold of adding bases to the candidate set. If this is not at the minimum, block 430 reduces the threshold and returns to process step 420. If block 425 is at a minimum level already, block 450 is executed. This block differentiates the location function between an emergency and non-emergency function. Thus, if a non-emergency function is being processed, system level changes are permitted only when the level of use is not high, since this could result in users loosing service by raising the interference level. In a non-emergency at high system loading, block 460 is executed. If an emergency is indicated, block 455 is executed before block 460. This occurs preferably in response to an emergency beacon signal to which the auxiliary pilot generators are tuned, and will automatically respond to; alternatively, an emergency signal can be sent to a serving base and processed to control the auxiliary bases to activate. In the latter case, a second non-emergency request signal could be similarly used, with an activation command being generated if the control processor (e.g., processor/searcher 361 of BSC 360 in FIG. 5) indicates system loading is beneath a loading threshold. Block 455 thus activates nearby pilot generators that provide more complete coverage of the service area by multiple sites, allowing the subscriber to receive a signal from multiple bases. Block 460 tests to see if the subscriber is in 3-way soft handoff. If not, the subscriber is instructed 465 to form a 3-way soft handoff condition using the largest rays from at least three base stations. If the result of 460 was positive, or block 465 was completed, block 440 is executed and the collection of data is made as described above in connection with FIG. 2. This data is used to process the location estimate (e.g., in searcher 280 using additional data from memory 281 of FIG. 2), and the system is returned to nominal conditions 445.

Returning to block 415, if the subscriber is in 3-way handoff, block 440 is executed. Returning to block 420, if there are three bases in the candidate set, block 435 is executed, which places three different bases in the active set. Then block 440 is executed, as described earlier, followed by block 445.

Figure 8B:
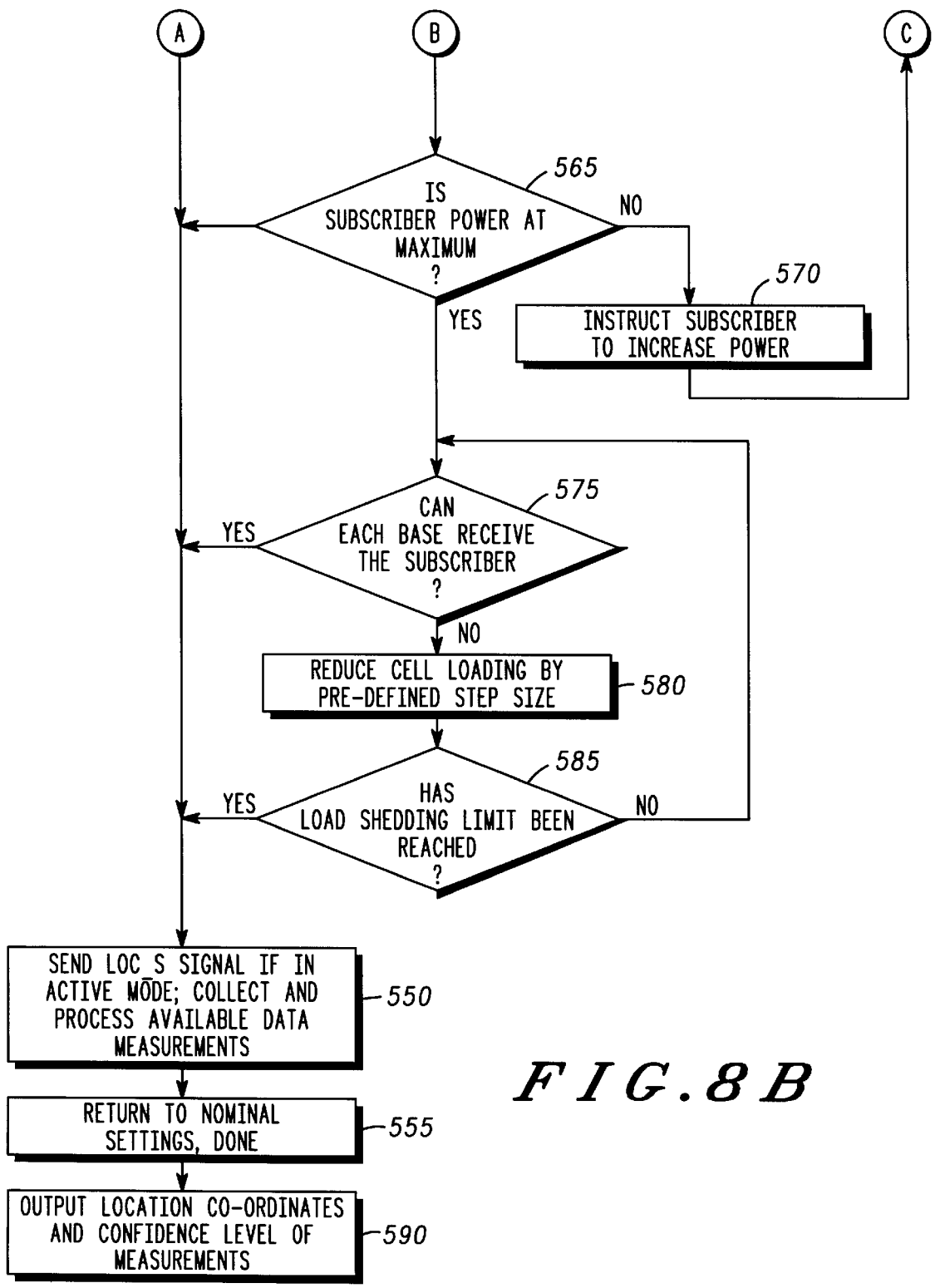
FIG. 8 is a flow chart illustrating the process by which a base station measures subscriber signals according to an embodiment of the invention.

FIG. 8, generally designated as 500, is an illustrative flow chart of the process for the base stations measuring the subscriber unit to obtain a location estimate. The process starts in block 505 when the location function is activated. Block 510 checks the status of the subscriber and a decision is made 515 based on whether or not the subscriber is in 3-way soft handoff. If it is not, block 520 is optionally executed, which tests to see if there are three bases in the candidate set. If not, decision block 525 is tested to check the threshold of adding bases to the candidate set. If this is not at the minimum, block 530 reduces the threshold and returns to process step 520. If block 525 is at a minimum level already, block 535 is executed, which will continue the processing of the location estimation, but now with only two bases, which is less accurate than the desired case of having three bases in the measurements. Returning to block 515, if the subscriber is in 3-way soft handoff, or block 520 if three bases are in the candidate set, then block 540 is executed. Block 540 insures that the three base stations are active for receiving the subscriber's signal. Then block 545 is optionally executed. This block tests to see if each base can receive the subscriber. If each base can, block 550 is executed which sends a location request signal if in active mode, and in both modes collects the available data and processes the location estimate in the manner described above. Block 555 follows returning all parameters to normal and the measurements are complete. Returning to block 545, if less than three bases can receive the subscriber, block 546 tests to see if auxiliary base units are available. If so, the local auxiliary sites are activated in block 547, and block 560 tests to see if an emergency is indicated. If not, only the bases that are received can be used in the measurements, and this can degrade the quality of the estimate. If an emergency is indicated (e.g., by a subscriber signal such as the dialed digits 911, or emergency request from an authorized entity connected to the infrastructure), block 565 is executed to test if the subscriber unit is at maximum power. If not, block 570 is executed to increase the power and the process returns to block 540. If block 565 is at maximum power, block 575 tests to see if each base can receive the subscriber. If so, block 550 is executed; otherwise the cell loading is reduced by block 580 to increase the effective range of the cells in the active set that are having difficulty receiving the subscriber unit. Then block 585 tests to see if the load shedding limit has been reached, and if so, block 550 is executed; otherwise, decision block 575 is executed again to test to see if each base can now receive the subscriber.

Load shedding includes a number of methods of reducing cellular traffic or transferring such traffic so that a higher number of base sites can be used to provide a more accurate location estimate. The subscriber load can be dropped off the air, or it could be moved to other CDMA carriers, or even to AMPS channels, etc. Thus when needed, the CDMA channel of interest could be cleared out, or the user which needs to be located could be handed off to a lightly loaded channel. In addition, system parameters can be changed to improve the ability to measure the subscriber unit. In combination with changes in load, or independently, changes in the pilot, (PPG) power can be made to change the zone of coverage from various base sites to increase the ability of a base station to cover a region of interest. A portion of the PPG power at a base station could be selectively applied to a beam, formed to track a given subscriber unit so that the ability of a given subscriber to be in contact with a given base is increased.

In a second embodiment of the invention, a method and apparatus are provided for determining a subscriber's location. As noted above, subscribers in the field can be located by deriving simultaneous distances to at least three sites. With fewer sites, there are typically greater uncertainties in determining the users location. By using angle information, these uncertainties can be reduced, which is particularly important when fewer than three sites are used. In addition, even when three or more sites are available for location determination, by using angle information improved confidence can be obtained.

Figure 9:
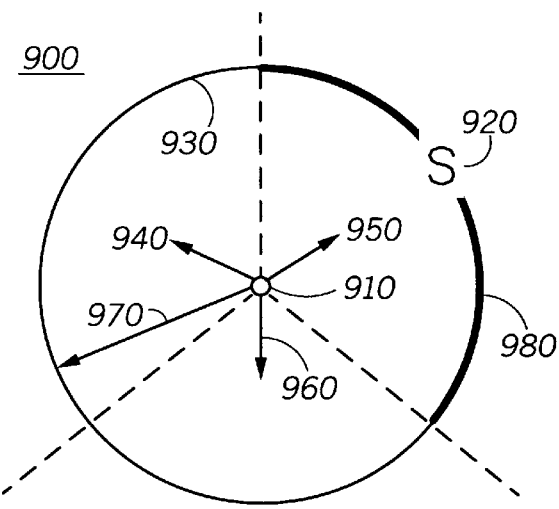
FIG. 9–13 are diagrams illustrating location finding of a subscriber unit in accordance with a second embodiment.

Referring first to FIG. 9, a single base site 910 in communication with the subscriber unit (S) 920 is illustrated. Since only a single base is participating in the location measurement, a time or distance calculation (as per the first embodiment) will only give a radius, e.g. 970, from the site. This produces a large uncertainty in angle, since the user could, absent further information, be anywhere within the 360 degree angle 930 defined by the radius 970. By using sectored antennas, whose boresite angles are shown as vectors 940, 950, & 960, comparisons between the received signal levels from each of the sectored antennas allows the strongest signal to be identified, which indicates the direction from which the strongest propagation path is received. This is generally the best estimate of the direction from which the subscriber is located. Thus, e.g., where the strongest signal is received at the sector antenna whose base site vector is 950, the probable location for subscriber 920 is along the arc 980 defined by the sector angle orientation and determined distance 970 (+/−the uncertainties in distance and angle; with further refinements (discussed below) even better estimates can be made even with use of only a single base site. The dashed lines in FIG. 9 show the separation between the sectored antennas 940, 950, & 960, where the best coverage area switches between sectors. If two sectors have close to the same received signal level, the subscriber could be generally considered to be on the boundary between sectors.

Figure 10:
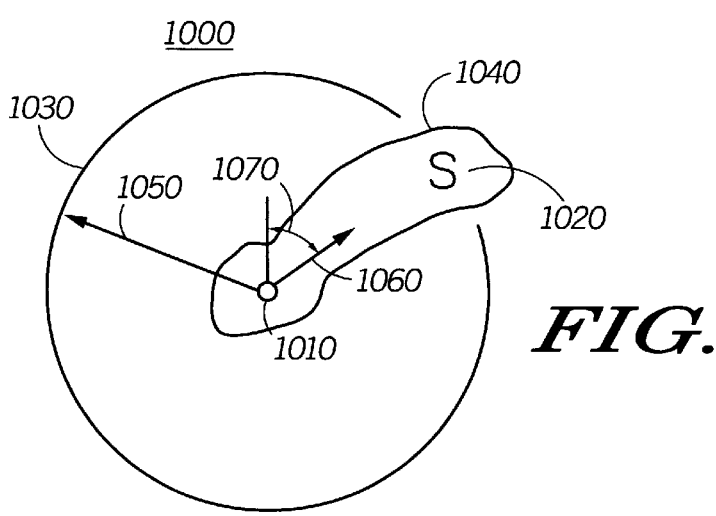

Referring to FIG. 10, the sector antennas have been replaced by an antenna array, or a set of narrow fixed beam antennas, at base 1010, providing an even greater degree of angle resolution. The beam pattern, 1040, is quite narrow. (Alternatively, an antenna that rotates could also be used to find the best angle to the subscriber.) The angle 1070, represents the angle to the best propagation path, or the angle to the signal with the shortest propagation delay which is in the direction 1060. A radius 1050, which is a distance measurement from the base site 1010 to the subscriber unit 1020, may be determined by calculating the propagation delay as described above. By finding the best angle, 1070 to the subscriber, 1020, an improved location estimate based on the radius 1050 and the angle 1070 can be obtained.

It is contemplated that other antenna configurations having defined receive/transmit angles can be used; e.g., a rotating antenna can be used to determine the best angle based on where the strongest signal level is present as it sweeps through a desired region (omni, sector, or the like). In addition to measuring horizontally for the subscriber unit, in certain applications it may also be desirable to measure vertically. An additional method of estimating the height is to use microcell sites that apply vertical beam steering patterns to estimate subscriber height as well as longitude and latitude.

Figure 11:
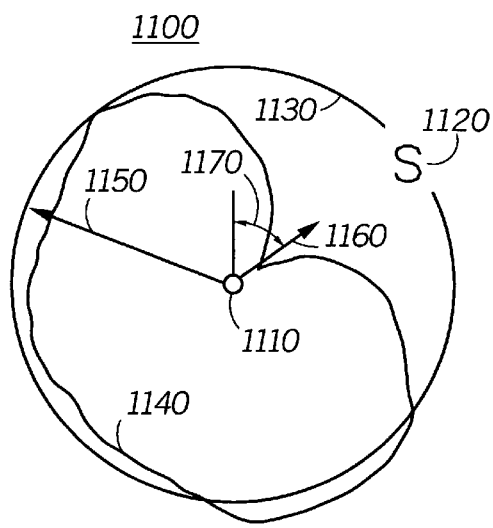

Referring to FIG. 11, an antenna array at base 1110 which is capable of tuning a notch in an antenna pattern 1140 in the direction of the subscriber 1120 is illustrated. Tuning a notch in the direction of the subscriber 1120 is also referred to in the art as null steering. Although FIG. 11 shows that the antenna pattern has a notch at angle 1170, and having nearly constant gain in all other directions, it could be similar to beam 1040, which is tuned away from subscriber 1120, such that the gain in the direction of the subscriber 1120 is reduced from the peak. By tuning the main beam on either side of the subscriber, the gain in the direction of the subscriber 1120 is reduced. When the antenna gain directed toward the subscriber unit 1120 is reduced, the standard power control loop which is part of the IS-95 CDMA system specification causes the subscriber 1120 to increase its transmit power level. When the subscriber 1120 increases its transmit power, it may be possible for the searcher (part of the base station receiver) to identify potential signal paths to the base 1110 that may be earlier in time but are more difficult to detect, such as signals that suffer more attenuation in its propagation path from base to subscriber than the strong signal path at angle 1170. By tuning the main beam across the area, improved gain can be applied to directions from which a shorter propagation delay exists. If a signal received from a path of shorter delay time is detected, a corrected angle can be determined by locking onto and measuring the angle for this path having shorter delay. Since increasing the power of the subscriber is a basic method to improve the potential for the signal to be received at other bases, the effect of tuning a notch in the direction of the subscriber 1120 is another method of allowing other bases to benefit from the increase in subscriber power.

Figure 12:
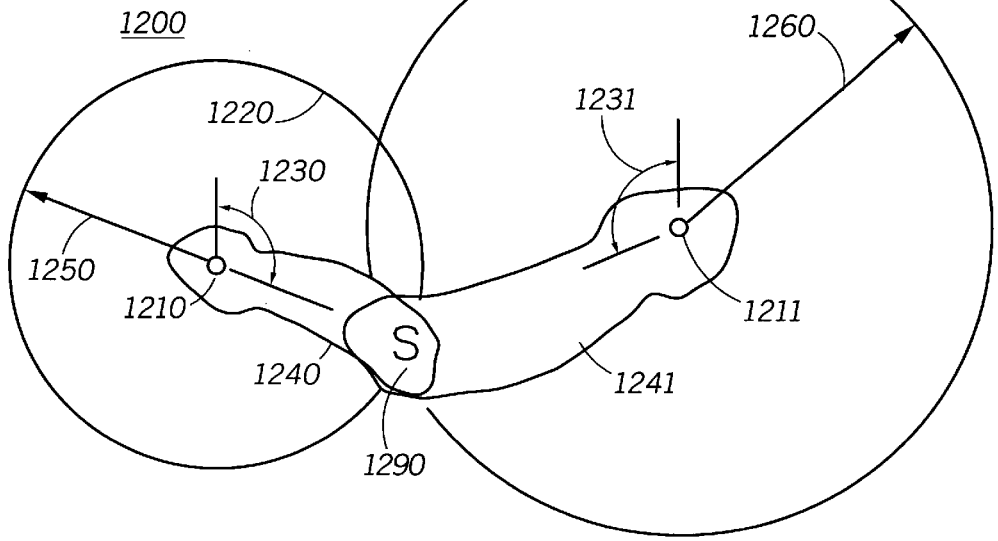

FIG. 12 illustrates the combination of angle and distance estimates from two sites 1210, 1211 to improve the estimation of the subscriber (1290) location. Two sites are shown, 1210, and 1211, which can have fixed sectored narrow beam antennas, or steerable adaptive antennas formed by antenna arrays, or by movable beam antennas. Here, steerable beams are shown, 1240, and 1241. By estimating the time delay of the signals, radius values 1250 and 1260 may be obtained. It is noted that these radii cross in two different locations, thus without any angle information, there is an uncertainty in the location of the subscriber 1290. Due to the angle resolution of the antennas, angle of arrival measurements 1230 and 1231 can be estimated which allows a more accurate location estimation for subscriber 1290. Two method are shown in FIG. 12 to estimate the distance from the base to the subscriber. The radii 1250 and 1260 are obtained from absolute time measurements. A second line 1270 is shown which represents the relative time difference also referred to as time difference of arrival (TDOA). In the TDOA method, the time difference is calculated between two paths from the subscriber to each of two base stations. The TDOA measurement results in hyperbolas of constant time difference as illustrated by line 1270. The use of angle estimates to improve the location estimate as illustrated with respect to FIG. 12 may be implemented using either absolute time measurement or TDOA, or both.

Figure 13:
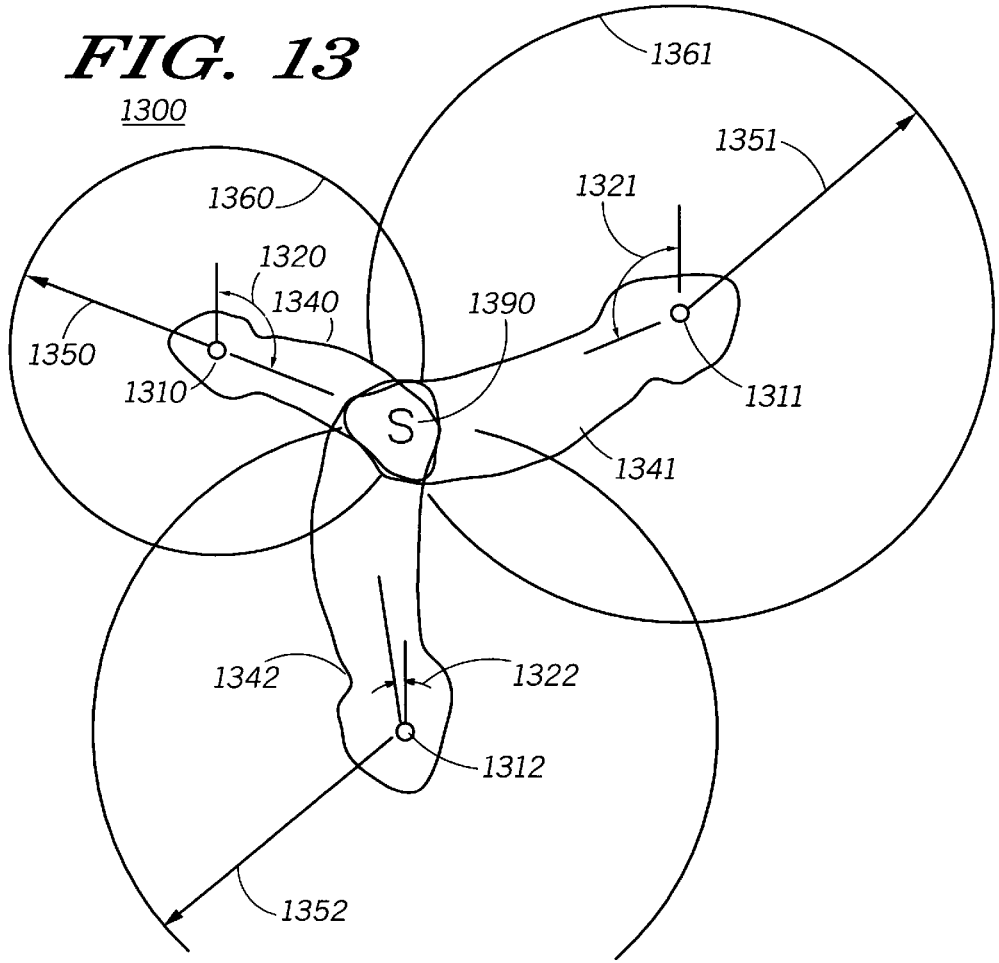

FIG. 13 illustrates the combination of angle and distance estimates from three sites to improve the estimation of the subscriber (1390) location. Three sites are shown, 1310, 1311, and 1312, which can have fixed sectored narrow beam antennas, steerable adaptive antennas formed by antenna arrays, or movable beam antennas. Here steerable beams are shown, 1340, 1341, and 1342. By estimating the time delay of the signals, radius values 1350, 1351 and 1352 are obtained. It is noted that these radii cross at one unique location, and if the time delay information were completely precise, the angle information would not be needed. However, Since there are uncertainties in the timing information in any real world system, the use of angle information from the three sites can improve the estimate of the location. Angle estimates 1320, 1321, and 1322 are obtained from sites 1310, 1311, and 1312 respectively. The use of angle of arrival estimates to improve the location estimate of a particular mobile subscriber unit as disclosed with reference to FIG. 13 may be implemented with absolute time measurements, TDOA measurements, or both. In certain location applications, TDOA is preferred since an absolute time reference is not necessary. Further, it is to be understood that TDOA may be used instead of or in addition to absolute time measurements in any of the embodiments disclosed herein.

Figure 14:
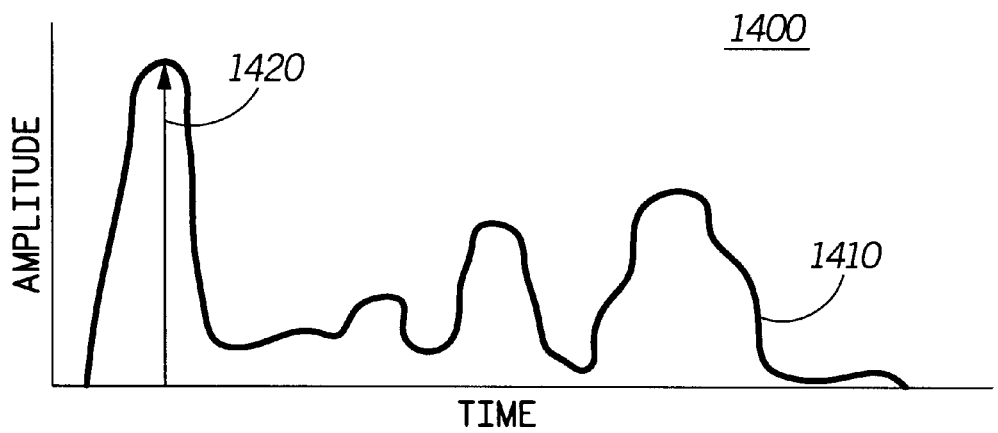
FIG. 14–15 are general diagrams illustrating reception of a signal from a subscriber unit by a base station.
Figure 15:
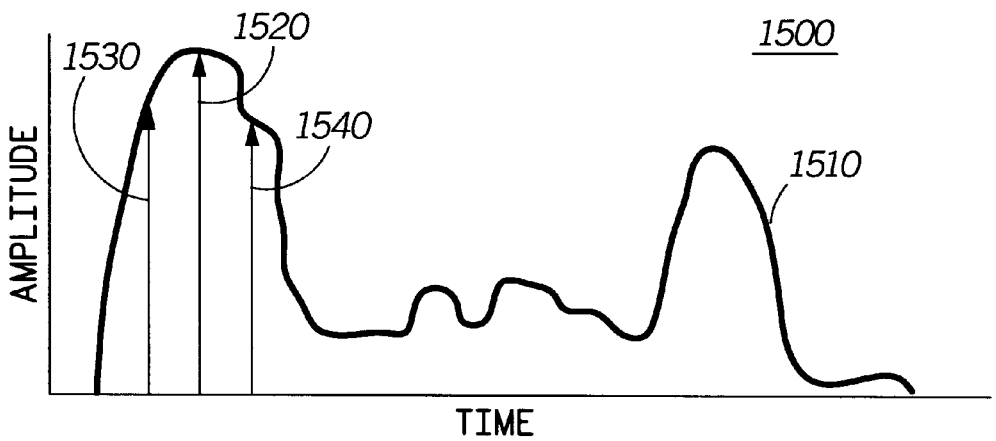

Referring to FIG. 14, a method of receiver finger management to attempt to find the first arriving ray, which represents the most direct propagation path between base and subscriber is illustrated. When only nominal multipath scattering affects the first arriving ray, the signals arrive at narrowly defined time as shown in FIG. 14. Peak amplitude 1420 shows the location of the correlation receiver set to receive this first main peak of the power delay profile 1410. When there is significant scattering sufficiently separated in distance to make the first arriving peak spread out, the processing of the searcher of the correlation receiver in the base site may tend to find a single peak and lock a correlation receiver finger onto the single peak described in reference to FIG. 15. Conventional searching and locking methods for assigning fingers based on power alone have the disadvantage of often ignoring the leading edge of the first arriving ray, which is more representative of the shortest path to the subscriber. This problem is particularly troublesome if the scattering causes the first arriving ray to be broad as shown in power delay profile 1510. For example, a first ray 1530 of the received signal may be arrive earlier than the peak 1520 of the signal.

To overcome these problems, the searcher can be programmed to scan earlier in time to find the earliest arriving rays that are still within a fixed threshold from the peak. By setting the correlation receiver to an off-peak location, a second correlator can sometimes be locked onto a second ray 1540 to obtain some signal diversity, where the first ray 1530 and the second ray 1540 may yield a better combined result than correlating on the peak 1520. For purposes of estimating the shortest delay time and therefore the best location, first ray 1530 provides a better estimate than using power level alone.

Figure 16:
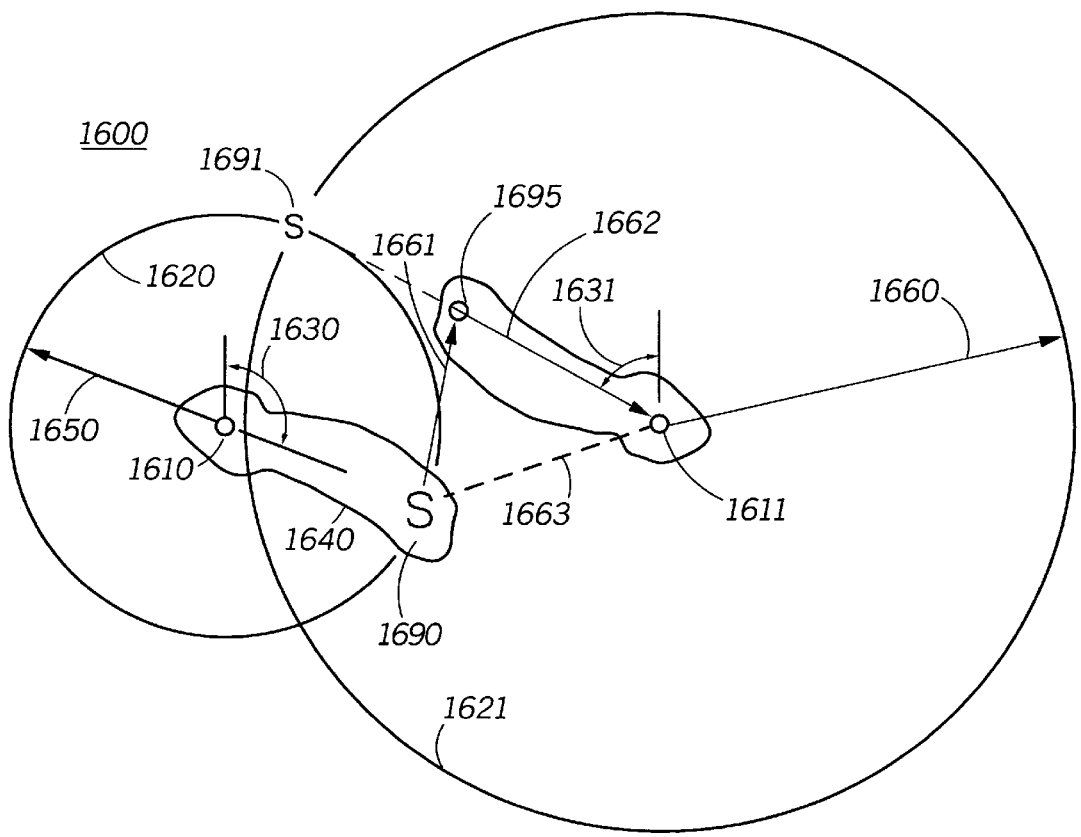
FIG. 16 is a diagram illustrating location finding of a subscriber unit when there is an obstruction between the subscriber unit and a base station.

FIG. 16 illustrates the condition where two bases are receiving a signal from subscriber 1690, but due to a blockage along path 1663, the signal is weak and not detected by site 1611 in its true direction, but rather a reflection causes the path from 1661 to 1641 to be stronger, and the angle is estimated as shown by 1631. The predicted distance 1660 is based on the distance of paths 1661+1662, which places the estimate beyond the actual position of the subscriber, 1690. For site 1610, the estimate of the distance 1650, and the angle 1630 are within the accuracy limits defined by a direct path. In this situation, the information from the two base sites 1610, 1611 is found to be contradictory, and thus a simple calculation of the location is not possible. A location estimate at 1691 would seem to be appropriate based on the distance estimates 1650, and 1660, and angle 1631, however angle 1630 contradicts this assessment. The true location, 1690 is indicated by distance 1650, and angle 1630, but the other inputs do not agree. For this situation, an error estimation and recovery method is very desirable.

Since reflections typically only make the measured propagation distance longer, more weight is given to shorter distances. By analyzing each path for potential for strong reflectors, the probability of seeing a reflection is determined. In addition, the potential for blocked paths is added to the analysis to improve the estimate of which path is the actual path, and thus what the best location estimate should be.

The path in the direction of 1631 is scanned from a previously generated database of obstacles which are deemed capable of generating a strong specular reflection. This path is checked along the full radius, and location 1695 is determined to be a location which has a strong specular reflection potential. By calculating the distances, location 1690 is found to be a valid location for a path 1661 & 1662. It is further noted that path 1663 is blocked to a significant degree which is also stored in a previously recorded database. In checking the other site, there is no obstacle found along the path from 1610 to 1690, thus this path is believed to be reliable. Thus, in analyzing the available inputs, location 1690 is determined to be the best estimate for the true location of the subscriber unit.

An example of such an error estimation and recovery method is now described.

Step 1, determine location estimate based on each site using estimated range and angle of arrival to the base.

Step 2, determine if all inputs are complimentary, and if so, calculate the location estimate including all inputs to the degree of the information supplied by each.

Step 3, if not, then begin the error estimation and recovery steps.

Error estimation and recovery steps:

Step 1, For each site, analyze the path in the direction indicated by the angle information to determine the potential for strong reflectors as previously recorded in a database.

Step 2. For the site with no known reflectors, assume location estimate is valid and continue.

Step 3. Check for concurrence by other site. Check for reflectors in the direction indicated and determine if there exists a path that is capable of being the proper length and arriving at the proper angle given the potential reflectors indicated. If so, then this verifies the location estimate. If not, then verification is not possible, and an uncertainty exists until it can be removed by another method, such as subscriber tracking. As an interim step, the location estimate by the site with the shortest range may be suggested as the proper location, but both locations may be used for some purposes with given levels of reliability displayed until a more confident solution is obtained. Those skilled in the art will appreciate that a similar method can be performed using the TDOA method instead of using absolute time measurements.

Figure 17:
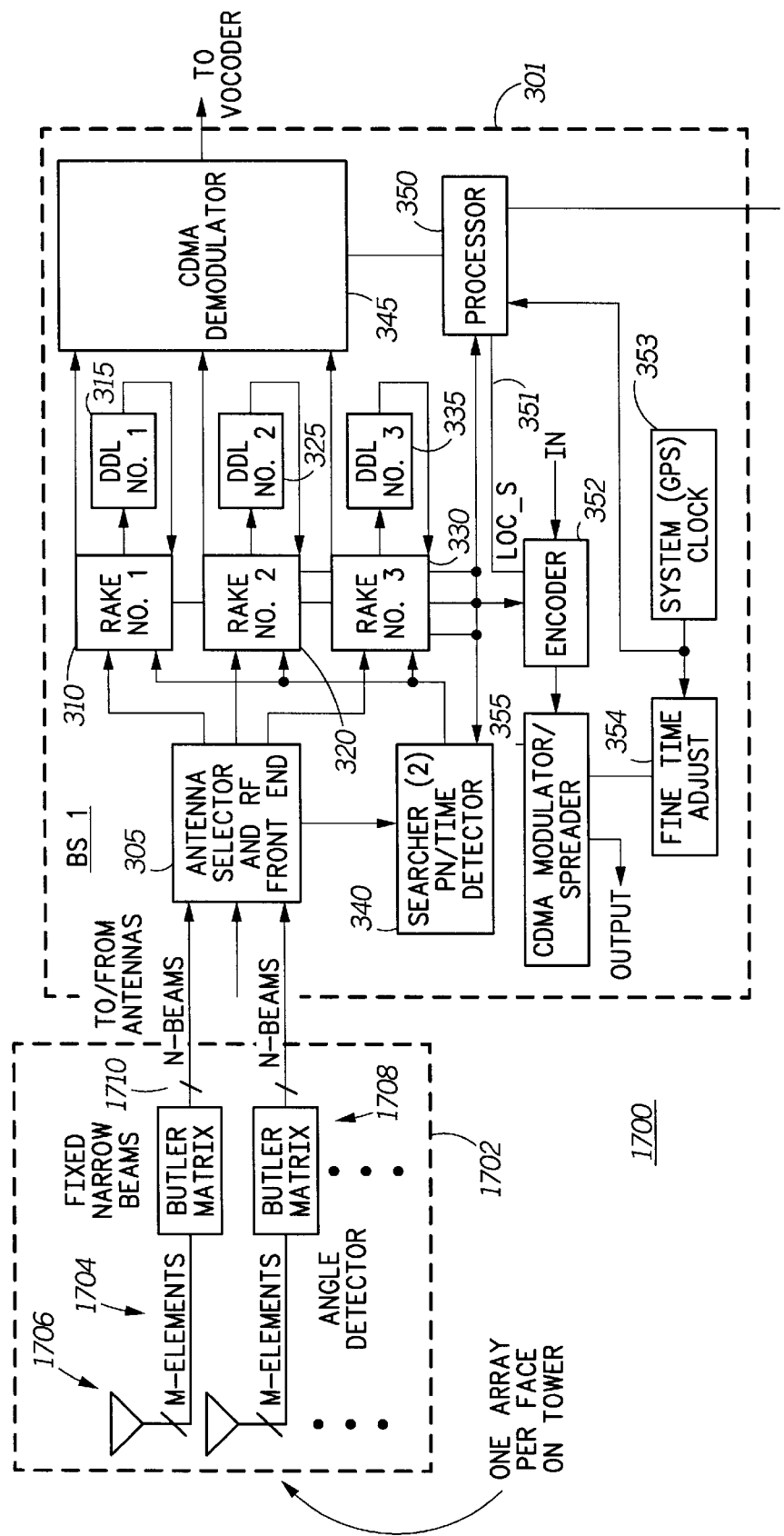
FIG. 17 is a block diagram of a first receiver implementation in a base station for use in location finding according to the second embodiment.

Although it is contemplated that there are many specific implementations of a wireless communication system that can perform both distance measurements and angle of arrival estimates, a few examplary systems will now be described. Referring to FIG. 17, a wireless communication system suitable for performing location as described above is illustrated. The system 1700 includes an angle detection unit 1702 and a base station 301. Note that the base station 301 has been described in great detail above. The angle detection unit 1702 includes a plurality of antennas (M, which is preferably a power of two such as 8) 1706, each coupled to a butler matrix 1708 via a signal line 1704. Each butler matrix 1708 is then coupled to an antenna selector and RF front end unit 305 via a signal line 1710. The Butler matrix 1708 combines the M elements 1706 in amplitude and phase and provides N outputs, where N is preferably also a power of two, such as 4. Each of the antennas 1706 is an element which forms a narrowbeam antenna pattern directed toward a different angle of interest. Preferably, there is an antenna 1706 for each face of an antenna tower (not shown). In a particular example, a 120 degree sector could be covered by 4 adjacent narrow beams of 30 degrees each. Those skilled in the art will appreciate that by using narrowbeam antenna patterns and by detecting the signals corresponding to each of these narrowbeam antenna patterns, an estimate of the angle for the received signal from a subscriber unit may be determined, such as by selecting the beam with the strongest signal strength measurement. Although only a single angle detector 1702 and a single base station 301 are shown, it is to be understood that multiple base stations 301 with multiple angle detectors 1702 may be used within a complete wireless communication system, such as a cellular CDMA system, to perform location estimates of a subscriber unit.

Figure 18:
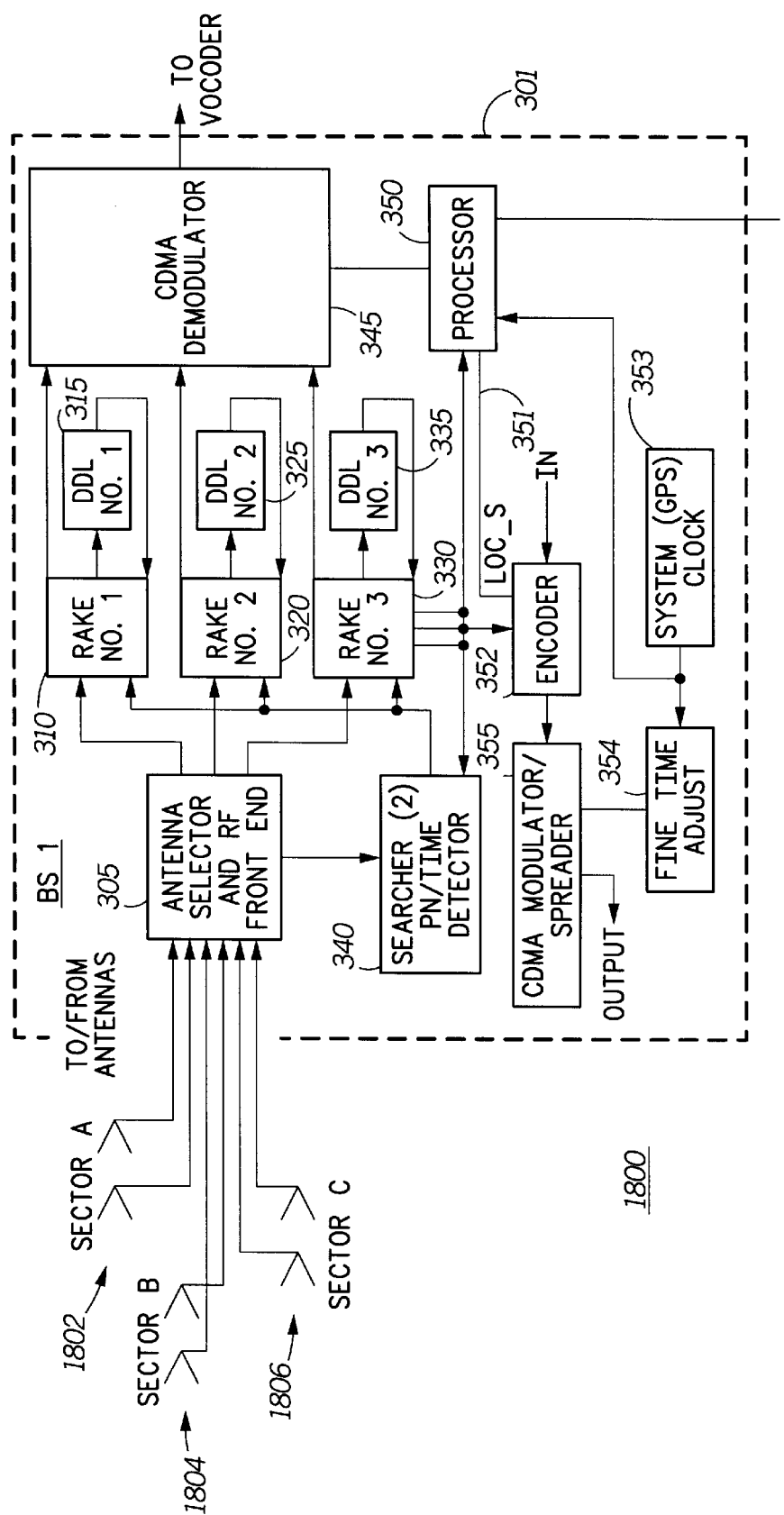
FIG. 18 is a block diagram of a second receiver implementation in a base station for use in location finding according to the second embodiment.

Referring to FIG. 18, an alternative implementation for detecting angle of arrival is illustrated. In the system 1800 of FIG. 18, sector antennas 1802, 1804, 1806 are used instead of the fixed narrowbeam antennas 1706 and the Butler matrices 1708 used in the system 1700 of FIG. 17. Two antennas are used at each sector and are generally installed several meters apart to provide spatial decorrelation and diversity reception. Also, each of the sectors in this example are positioned directionally 120 degrees apart. An estimated angle of arrival is based on the signal strength from each of the sectors 1802, 1804, 1806, such as by estimating the angle is received in the direction from the sector with the strongest signal measurement. In addition to fixed narrowbeam antennas or sector antennas, the angle detection unit 1702 may be implemented in many other ways, such as by using a beamforming network with appropriate control and feedback circuitry.

Figure 19:
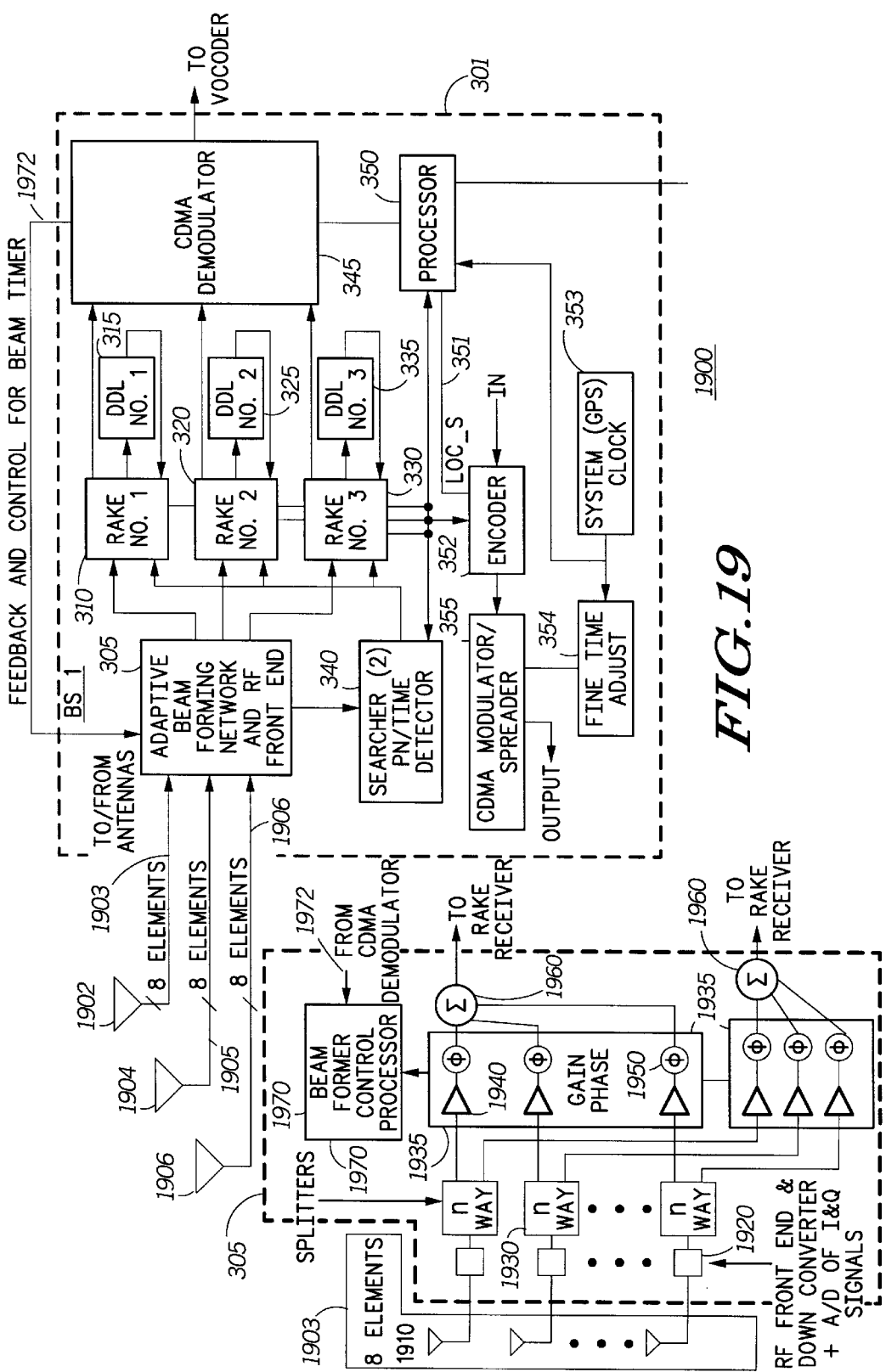
FIG. 19 is a block diagram of a third receiver implementation in a base station for use in location finding according to the second embodiment.

FIG. 19 illustrates the connection of an adaptive antenna array to a CDMA receiver. Each sector is represented by an adaptive array antenna shown as 1902, 1904, and 1906 which is connected to the adaptive beam forming network 305. A feedback signal 1972 is connected to the beam forming network from the CDMA demodulator 345. The feedback signal 1972 may be derived from several sources, such as from the rake fingers 310. The array network receives signals from an array 1903 with each element 1910 connected to an RF front end and downconverter unit 1920. The downconverter unit 1920 also provides analog to digital quadrature sampling of the downconverted signal to create digital samples. Splitters 1930 distribute samples from the downconverter unit 1920 to separate adjustment banks 1935, each of which contain gain 1940 and phase 1950 adjustments. A beamforming control processor 1970 perform gain and phase adjustment calculation and controls the respective gain 1940 and phase 1950 devices in the adjustment banks 1935 based on feedback information from the receiver, such as rake receiver 310. Outputs from the adjustment banks 1935 are summed at summer 1960 and then fed to a corresponding rake receiver 310, 320, 330. An angle estimate for a signal received from a mobile unit is determined by evaluating the gain and phase values used to adjust the array antenna.

In addition to using angle of arrival and distance information, many other techniques may be used to improve the location estimate of a subscriber unit. For example, in order to improve the ability of the base station to detect the subscriber unit, a number of possible methods can be employed to increase the transmit power of the subscriber, either on access, or during a call. These methods include the following techniques:

1.) Adjusting the system gain for the given subscriber unit. This can include using an adaptive antenna array to steer a null, or to reduce the gain in the direction of the subscriber. By reducing the gain in the direction of the subscriber, additional path loss occurs, and this requires the subscriber to transmit more power to maintain or achieve access to a call. Increasing input attenuation at the base station receiver may also be used to reduce system gain.

2.) By selectively adding time delay to the base station in response to an initial access, the subscriber unit will automatically send new access requests at successively higher power levels, with a given time between attempts, and a specified limit to the number of attempts and the maximum power sent, according to the standard software specification for CDMA subscriber units as set out in IS-95. Thus by adding delay prior to responding to a subscriber access request, the subscriber unit will transmit repeated attempts at higher power, thereby allowing multiple base stations to attempt to measure the signal from the subscriber unit. The amount of delay could be of a specified duration, or could be controlled by a number of parameters including the number of base stations that were able to measure the subscriber unit's access attempts.

3.) By adjusting antenna gains or directivity at the subscriber unit, the pathloss to the strongest base can be increased to cause an increase in transmitted power at the subscriber unit, and modify or improve the antenna gain in the directions of other bases. This function could be commanded by the base station to provide for an improved likelihood of obtaining multiple paths to other bases.

A number of conventional methods exist to locate subscribers in the field, such as using the Global Positioning System, GPS. Improvements on GPS include the use of Differential Correction, in which error signals are transmitted from auxiliary GPS receivers over the subcarriers of FM radio stations, and can be picked up with small receivers. Additional improvements which are available for vehicles, include dead reckoning functions, which measure the distance traveled and angle of heading. These combined methods can be applied to achieve location accuracy with an error generally less than 10 meters in the worst cluttered areas, and better in open areas. Unfortunately, due to cost concerns, it is not currently practical to use these more accurate location methods for the average user.

However, it is contemplated that such high accuracy, but high cost systems could be used as a method to calibrate the cellular location system. By driving a vehicle equipped with a GPS receiver with differential correction plus dead reckoning, (and other possible improvement methods), a location log can be recorded for each drive test. Likewise, location estimates made by the cellular infrastructure equipment can be recorded in a log. Since each log can be time stamped with GPS time, the two logs may be compared to correlate and calibrate the location estimates. A database can then be created based on the location estimates and can be accessed as a function of time delays, and angle estimates of the base antenna beam directions. This database can then be used to improve the accuracy of the location estimate. For example, by using the estimated time delays and angles to look into the database, previously close combinations of inputs that occurred during the calibration drive tests and the corresponding recorded GPS location may be used to provide an improved location estimate. The use of surveyed locations can also be used for calibration in this way, e.g. the test probe can move to a surveyed location for the location estimate to be calibrated.

This database method can be applied in several ways. By analyzing a large sets of drive routes, particularly bad locations can be determined, such as in FIG. 16, where a specular reflection caused a strong signal to follow a path other than the shortest. Thus known reflections, and shadowing obstructions can be identified and logged. Later when contradictory information is collected by the location algorithm, the area can be checked for possible aberrations which would produce the effect. Then the algorithm could be modified to account for these effects to improve the confidence of the location estimation, such as in FIG. 16 where path knowledge of a reflector in the direction of angle 1631 can be used to adjust the radius 1660 along path 1662 to form a radius from a known reflector as implied by distance 1661. This allows an improved estimate of location 1690 by use of the database information that there was a reflector in the direction of 1631 and the path 1663 was shadowed for the location of interest at 1690.

Additional information can be recorded during the logging procedure and used to compare to the present subscriber's signal for additional information from which to compare. For example, Rician K factors can be estimated for each location, along with power levels and statistics of delayed rays.

Another method of providing improved location estimates is to use predictive models. With the improvements in prediction models, i.e. with advanced Digital Elevation Maps, (DEMs), Ortho-Photos, and Land Clutter models that include building data, a complete 3D model of the environment is possible with a high degree of accuracy, approaching less than 1 meter accuracy. With these predictive model databases, it is now possible to perform Ray-Tracing propagation prediction modeling that include multiple levels of reflections and diffractions. Thus rays can be modeled as they reflect from the ground, or from buildings, or diffract around corners, or over the rooftop. By using such a model in combination with the measured time delays and angle information obtained at the base site, improvements in confidence in the location estimate can be achieved. As in FIG. 16, the shadowing of path 1663 could likely be predicted, as well as the reflection along path 1661–1662. Thus, the information that first appeared to be contradictory, could actually be predicted, and thus be used to calculate the expected location, or aid in the interpretation of the measured results.

One feature that is desired in performing location estimates is the ability to track a user's location over time. When this is done, improvements in location estimates can be obtained by applying a number of algorithms. First, consider the example of FIG. 16. There are relatively few locations that will produce both a shadowing obstruction and a strong reflection, and a moving user will tend to pass through such an area relatively quickly. Thus by tracking a user, a sudden jump in the apparent distance or angle may indicate a reflection or other obstruction in the propagation paths which tend to make the location estimate less reliable for the time during which the subscriber passes through this obstruction area. By tracking the user, such as by taking periodic distance, angle, and location measurements over time, an estimate of speed and location can be used to predict loctions for up to a few seconds during which poor location confidence exists. Also, averaging can be applied to the user's location estimate to remove random fluctuations in the estimate. Averaging can be done both to tracked users, and to stationary or users who are not tracked.

Another method of improving location estimates is to use a geographic database. Geographic databases are now common and contain information such as road class, category, posted speeds, and a map of the road vectors. Measured information such as estimated speed and direction determined by the base sites of the cellular system can be used in combination with the location estimate and the geographic database to apply a user to the proper road, thus providing the ability to improve the location estimate by including the road information, and thus reducing errors, and improving the overall reliability of the location estimates. For example, by correlating to the geographical database, errors such as that of having estimated locations for subscribers driving across open fields and apartment complexes at highway speeds, when the highway is just a few dozen meters away could be detected and compensated for.

A number of further possible methods could allow for improved location accuracy, including the use of a mobile unit with a high confidence factor, e.g. with an integral GPS receiver which is sent back to the base station. If the location estimate of the mobile with the GPS unit corresponds to that of the subscriber with an unknown location, the unknown location can assumed to be the same as the GPS location.

By estimating the location of a subscriber unit, and calculating the angle and distance to a second subscriber unit, information relating to the direction to the first subscriber unit can be sent to the second subscriber unit to display the heading and distance to the location of the first subscriber unit. Additionally, location estimates, street coordinates, estimated speed and acceleration information could be sent to the second subscriber unit. Consider an ambulance or police car which is attempting to find the location of a user. By transmitting the heading and distance, and/or street coordinates to the police car, or the ambulance, a display could direct the police or ambulance to the location of the caller. In addition to the heading, distance, and coordinate information, an indication as to the estimated reliability of the information could be included in the display. A tracked response could display a series of locations which have different degrees of reliability to allow the user to see the last known location with high confidence, and later locations with lower or higher confidence levels, to allow the user to interpret the data using his knowledge of the area. A graphical map display would be the preferred method.

Units with known location, such as highway call boxes, could also be used to adjust and calibrate the location system. This would allow beam antennas, angles, and distance estimates based on timing (other than the time delay inside the subscriber units) to be calibrated on a routine basis. A number of these fixed subscriber units could be used at different angles and distances to aid in the system calibration.

With the use of multiple base sites, located at different relative heights, a multi-dimensional location system could be used to estimate the height of a subscriber unit. Consider a group of base sites, some being near the ground floor, and others being at various rooftops. By including the height dimension, and having adequate paths to measure, a height estimate can be made. Vertical beam patterns could also be used to improve on the estimate of mobile height.

With the improved location estimates of subscriber units as described above, many applications and services using such location estimates may be provided. For example, location estimates could be used for database accesses, such as yellow pages type requests for restaurants, service stations, etc.

Another example, is that caller ID for 911 emergencies could include location estimates, and nearest road or intersection, and speed, e.g. a user driving in a car can be distinguished from a user standing still or in a building.

Another application is that a user profile can include area boundaries such as zone billing. In a zone billing system, a subscriber could be billed at different rates based on location. For example, a low billing rate would be used at home and a higher billing rate would be used when the subscriber is in a car. Zone billing is useful to provide a convenient one number service where a subscriber can use the same phone at home, work, or while mobile.

Another application is that a user profile can include boundaries, such as disallowed areas. By periodic probes by the base station, the probes do not have to ring the subscriber's phone, the user's location can be tracked. When near a disallowed area boundary, the tracking can increase in frequency. If a user crosses a boundary into a disallowed area, a call can be placed to a predefined number with recorded information or data. A call can also be made to the subscriber unit with recorded information or data. Examples, include, rent-a-car companies requiring users to stay out of certain countries, or for a teenager to stay out of certain areas. Time of day could be part of the definition of a disallowed area.

In another application, at certain cellular site boundaries, there are different system operators with different types of systems. In some locations, an operator may have the "A" set of frequencies, and in another location the operator may have the "B" set of frequencies. Thus it is desirable to perform a hard handoff at the boundary without complex overlapping transition areas. By using the location estimates, a hard handoff (a change in carrier frequency) can be performed at the proper time and location. Heading and speed information can also be included in the handoff decision.

While the invention has been described in conjunction with specific embodiments thereof, it is evident that many alterations, modifications, and variations will be apparent to those skilled in the art in light of the foregoing description. For example, while the searchers 240 and 280 of the subscriber unit 200 and searcher 340 and processor 350, and other circuits, of the base station 301 are described in terms of specific logical/functional circuitry relationships, one skilled in the art will appreciate that such may be embodied in a variety of ways, such as appropriately configured and programmed processors, ASICs (application specific integrated circuits), and DSPs (digital signal processors). Further, the invention is not limited to determining location via chip information in an IS-95 CDMA system, but has applicability to any CDMA system or other communication systems. Further, while many applications for location have been described, it is contemplated that the resent invention is not limited to any specific location applications.

Accordingly, it is intended that the invention not be limited by the foregoing description of embodiments, but to embrace all such alterations, modifications, and variations in accordance with the spirit and scope of the appended claims and their equivalents.

What is claimed is:

1. A method for estimating a subscriber unit location in a communication system, the method comprising the steps of:
   receiving a signal from the subscriber unit at a first base station the signal being formed via modulation by a sequence of spreading symbols;
   determining a first receive time of the signal based on the sequence of spreading symbols at the first base station,
   determining an estimate of a first angle of arrival of the signal at the first base station, the estimate being determined using a fixed beam antenna; and
   determining the location of the subscriber unit from the first receive time, the first angle of arrival, and further predetermined information about the first base station.

2. The method of claim 1, further comprising the step of determining a second receive time of the signal based on the spreading sequence at a second base station.

3. The method of claim 2, further comprising the step of determining an estimate of a second angle of arrival of the signal at the second base station the estimate being determined using a fixed beam antenna.

4. The method of claim 3, further comprising the step of determining the location of the subscriber unit based on the second receive time and the second angle of arrival.

5. The method of claim 2, further comprising the step of determining a third receive time of the signal based on the spreading sequence at a third base station.

6. The method of claim 5, further comprising determining an estimate of a third angle of arrival at the third base station, the estimate being determined using a fixed beam antenna.

7. The method of claim 2, wherein the second base station comprises an auxiliary base station.

8. The method of claim 2, wherein the second base station comprises a microcell base station.

9. The method of claim 1, wherein the fixed beam of the antenna is formed using an antenna array.

10. The method of claim 1, wherein the fixed beam antenna is a sector antenna.

11. The method of claim 1, further comprising adjusting system gain for a given subscriber unit.

12. The method of claim 1, wherein the received signal has a first ray and a second ray.

13. The method of claim 12, further comprising the step of adjusting a time offset in a receiver of the first base station in response to the first ray of the received signal.

14. The method of claim 12, further comprising the step of adjusting an antenna array in response to the first ray of the received signal.

15. The method of claim 12, further comprising the step of detecting the first ray with a first finger of the receiver and detecting the second ray with a second finger of the receiver.

16. The method of claim 1, further comprising the step of increasing the transmit power of the signal.

17. The method of claim 16, wherein the transmit power is increased in response to a control signal from the first base site to the subscriber unit.

18. The method of claim 16, wherein the transmit power is increased by adding delay prior to responding to a subscriber unit access request.

19. The method of claim 16, wherein the transmit power is increased by decreased antenna gain in the direction of the subscriber unit.

20. The method of claim 1, further comprising the step of adjusting the estimate of the first angle of arrival to determine an adjusted estimate of the first angle of arrival.

21. The method of claim 20, wherein the adjusted estimate of the first angle of arrival is determined based on information from a geographic database.

22. The method of claim 21, wherein the geographic database comprises location zone mapping data.

23. The method of claim 1, wherein the predetermined information comprises a database.

24. The method of claim 23, wherein the database comprises a road database.

25. The method of claim 1, further comprising the step of calibrating the determined location by comparing the determined location with a calibration measurement.

26. The method of claim 25, wherein the calibration measurement is determined using a GPS receiver.

27. The method of claim 25, wherein the calibration measurement is a known location of a fixed unit.

28. The method of claim 1, further comprising the step of determining a height estimate of the subscriber unit based on the received signal.

29. The method of claim 28, wherein the height estimate is determined using a patch array antenna.

30. The method of claim 29, wherein the height estimate is determined using a vertical antenna.

31. The method of claim 29, wherein the height estimate is determined using an antenna below a roof top of a building.

32. The method of claim 1, further comprising the step of tracking the subscriber unit by performing a plurality of location measurements.

33. The method of claim 32, further comprising the step of comparing a location measurement with a prior location measurement.

34. The method of claim 2, further comprising handing off a call at one of the base stations to a second communication system.

35. The method of claim 1, further comprising performing a second location measurement using a second communication system.

36. The method of claim 35, wherein the communication system comprises a CDMA system and the second communication system comprises an analog cellular system.

37. The method of claim 1, further comprising the step of determining whether the subscriber unit crosses a boundary into a predefined area.

38. The method of claim 37, including the step of reporting the subscriber unit's boundary crossing to a predefined entity.

39. A method for estimating a subscriber unit location in a communication system, the method comprising the steps of:
   performing a first location measurement having a first confidence level by:
      receiving a signal from the subscriber unit at a first base station, the signal being formed via modulation by a sequence of spreading symbols;
      determining a first receive time of the signal based on the sequence of spreading symbols at the first base station, and
      determining an estimate of a first angle of arrival of the signal at the first base station, the estimate being determined using a fixed beam antenna;
   performing a second location measurement having a second confidence level;
   determining an estimated location of the subscriber unit based on the first and second location measurements.

40. The method of claim 35, wherein the second location measurement is based on a measurement from at least two base stations.

41. The method of claim 34, wherein the second location measurement is based on a measurement from three base stations and wherein the second location measurement has a higher confidence level than the first location measurement.

42. The method of claim 35, further comprising determining the estimated location of the subscriber unit based on a weighted combination of the first and second location measurements.

43. The method of claim 39, wherein the first location measurement is taken at a first time and the second location measurement is taken at a second time.

44. The method of claim 39, wherein the second location measurement is a calibrated measurement having a high confidence level.

45. A communication system having plural base stations and operable for locating a communication unit, the communication system comprising:
   a controller responsive to a first and a second base station, each of the first and second base stations comprising a receiver operable for receiving a signal from the communication unit, the signal being formed via modulation by a sequence of spreading symbols, the receiver adapted to be coupled to an antenna having a limited angle of reception, the receiver configured to determine an estimate of a first angle of arrival of the signal and a detector operable for determining a receive time of the signal based on the sequence; and
   a location processor responsive to the controller operable for requesting the first and second base stations to determine first and second receive times of the signal based on the sequence, and for determining a location of the communication unit from the first and second receive times, the first angle of arrival of the signal, and further information about the first and second base stations.

46. A wireless communication system, comprising:
   a first base station in wireless communication with a subscriber unit, the first base station receiving a signal from the subscriber unit, the signal being formed via modulation by a sequence of spreading symbols;
   a first time of arrival detector determining a first receive time of the signal based on the sequence of spreading symbols at the first base station,
   an angle of arrival detector adapted to be coupled to a fixed beam antenna, said angle of arrival detector determining a first angle of arrival of the signal at the first base station; and
   a location estimation unit determining an estimated location of the subscriber unit from the first receive time, the first angle of arrival, and further predetermined information about the first base station.

47. The wireless communication system of claim 46, further comprising a second base station in wireless communication with the subscriber unit.

48. The wireless communication system of claim 47, further comprising a second time of arrival detector determining a second receive time of the signal based on the sequence of spreading symbols at the second base station.

49. The system of claim 48, further comprising a second angle of arrival detector in communication with the second base station.

50. The system of claim 46, wherein the fixed beam antenna comprises a sectorized antenna.

51. The system of claim 46, wherein the fixed beam antenna comprises an antenna array.

* * * * *